US010819620B2

(12) United States Patent
Koshy et al.

(10) Patent No.: US 10,819,620 B2
(45) Date of Patent: Oct. 27, 2020

(54) SYSTEM AND METHOD FOR OPTIMIZING LAYER THREE LINK AGGREGATION IN A MESH NETWORK

(71) Applicant: Dell Products, LP, Round Rock, TX (US)

(72) Inventors: Kamal J. Koshy, Austin, TX (US); Sinem Gulbay, Austin, TX (US)

(73) Assignee: Dell Products, LP, Round Rock, TX (US)

(*) Notice: Subject to any disclaimer, the term of this patent is extended or adjusted under 35 U.S.C. 154(b) by 76 days.

(21) Appl. No.: 16/270,125

(22) Filed: Feb. 7, 2019

(65) Prior Publication Data

US 2020/0259737 A1   Aug. 13, 2020

(51) Int. Cl.
| | |
|---|---|
| *H04L 12/891* | (2013.01) |
| *H04W 84/18* | (2009.01) |
| *H04L 12/709* | (2013.01) |
| *H04W 24/10* | (2009.01) |
| *H04W 24/02* | (2009.01) |

(52) U.S. Cl.
CPC .......... *H04L 45/245* (2013.01); *H04W 24/02* (2013.01); *H04W 24/10* (2013.01); *H04W 84/18* (2013.01)

(58) Field of Classification Search
CPC ..... H04W 24/02; H04W 24/10; H04W 84/18; H04L 45/145
See application file for complete search history.

(56) References Cited

U.S. PATENT DOCUMENTS

| | | | |
|---|---|---|---|
| 2016/0094398 A1* | 3/2016 | Choudhury | H04L 45/42 370/254 |
| 2018/0035440 A1* | 2/2018 | Ohta | H04W 76/16 |
| 2018/0278570 A1* | 9/2018 | Dhanabalan | H04L 67/1002 |
| 2020/0007435 A1* | 1/2020 | Paida | H04L 43/0894 |

\* cited by examiner

*Primary Examiner* — Brian P Cox
(74) *Attorney, Agent, or Firm* — Prol Intellectual Property Law, PLLC; H. Kenneth Prol

(57) ABSTRACT

An information handling system operating a mesh network link aggregation optimization system may comprise a plurality of mesh access points, and one or more client devices connected via a plurality of wireless links forming a mesh wireless network. A processor may execute code instructions to generate a congestion score for each of the links based on measured traffic and quality of service of each of the links, determine the congestion score for a congested link does not meet a preset congestion threshold value, determine a location within the mesh wireless network in which to aggregate links between two mesh access points, based on availability of one or more radios, and transmit an instruction to one of the plurality of mesh access points to aggregate two or more links at the network layer at the determined location for simultaneous transmission on a single band.

20 Claims, 9 Drawing Sheets

SYSTEM AND METHOD FOR OPTIMIZING LAYER THREE LINK AGGREGATION IN A MESH NETWORK

FIELD OF THE DISCLOSURE

The present disclosure generally relates to a method and apparatus for an RF front end solution utilizing a plurality of radio antenna systems used with information handling systems. The present disclosure more specifically relates to a method and apparatus for optimizing the aggregation of multiple links at the network layer between a plurality of access points in a mesh network.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. Further, the information handling system may include transceiving antennas for communication of cellular, and WI-Fi signals on a plurality of frequency bands.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
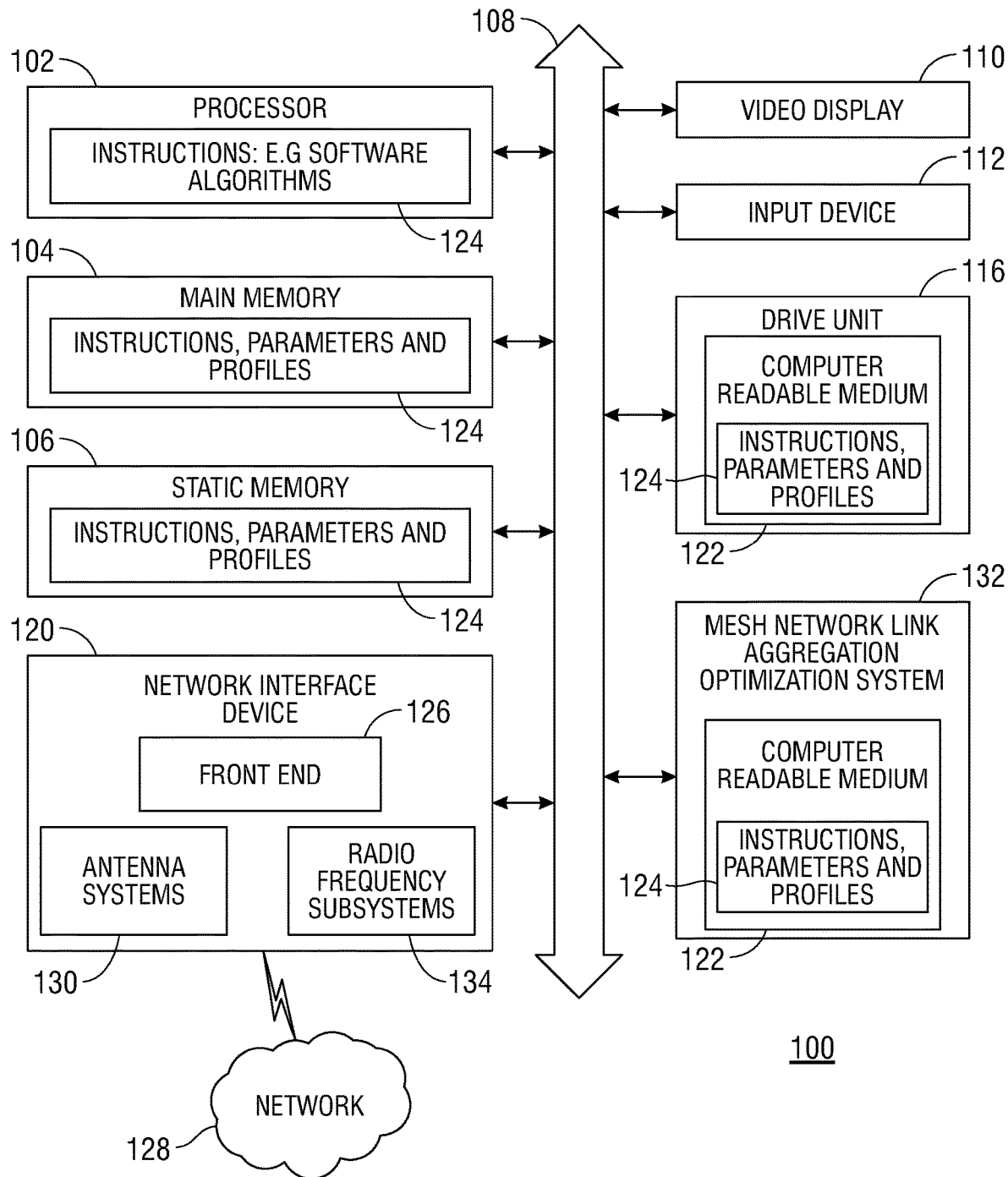
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

As reliance on mobile information handling systems, "smart" devices, and devices within the Internet of Things (IoT) in households and businesses increases, a need for complete and reliable wireless access throughout homes and businesses correspondingly increases. Many home and business wireless networks include one or more dead spots or places in the edge of the network where coverage becomes sluggish or unreliable. Areas of poor wireless coverage within a network may be caused by inefficient distribution of resources across the nodes of the network, traffic bottlenecks, interference between nodes or client devices, and physical obstruction of signals transmitted between access points and/or between an edge-network access point and a client device. Further, some mobile devices may have a limited number of antennas or antenna systems with limits on transmission power to further impact connectivity ranges. Current solutions to these problems include the use of signal repeaters in hierarchical networks, the use of mesh networking across a plurality of wireless nodes, and the use of multiple radios across either hierarchical or mesh wireless networks. However, many of the currently deployed wireless networking solutions may be complex or expensive.

The use of signal repeaters may address poor signal reception in a given area by extending the operational range of a hierarchical wireless network. In hierarchical networks, wireless access points may include a central router or gateway that transmits wireless signals to one or more downstream access points. Each of the downstream access points in such an architecture may operate to receive signals, but not to transmit. As such, all data transmitted to end devices in such an architecture must be received from the central router or gateway for that network. Signal repeating or involves transmitting a wireless signal that does not effectively service an area of spotty coverage to a downstream access point that can then re-transmit or "repeat" the signal transmission toward a client device within the area of spotty coverage. In effect, the "repeater" access point may serve as another gateway device capable of transmitting signals to one or more downstream client devices that are not receiving serviceable signals directly from the main gateway. This may form a chain of links connecting the main gateway with the client device, including a first link between the main gateway and the repeating access point, and a second link between the repeating access point and the client device.

The act of "repeating" or retransmitting the signals in such an architecture may be referred to herein as "hopping," because data having a final destination at a downstream client device serviced by the signal repeater may begin at the main gateway, "hop" past the signal repeater, and end at the downstream client device. During such a hopping procedure, the signal repeater access point may receive the packet addressed to the MAC address of the downstream client device, access a MAC address lookup table to determine which port is connected to the client device having the MAC address associated with the packet, then transmit the packet via that port to the client device having that MAC address. This processing of the received packet increases the time of delivery of the packet from the main gateway to the client device. Because the time of delivery is increased in such a way during the "hop" taking place at the repeating access point, the data rate, or number of bytes transmitted per second between the main gateway and the client device decreases by at least half. When more links are used to form the chain between the main gateway and the client device, the access points connecting each of the links must perform this same or a similar lookup process. Thus, when more links are used, thus increasing the number of hops used, the data rates on each of the links of the chain are reduced by a value of the inverse of the number of hops. For example, if five hops are used, the data rate on each link of the chain may be equivalent to one-fifth the data rate of a single link between the main gateway and the client device. Thus, use of signal repeaters may fail to fully address the problems related to dropped or weakened coverage in the edge of the network because the signal transmitted from the repeater toward an area of spotty coverage may be much weaker than the signal received by the repeater, especially if multiple hops are needed to address the problem. A solution is needed that does not have the unfortunate side effect of degrading the signal quality as it approaches the area of spotty coverage.

The use of mesh networking may operate to decrease the number of hops necessary to reach an area of spotty coverage. In contrast to hierarchical networks, wireless mesh networks may connect a plurality of access points directly, dynamically, and non-hierarchically such that each node cooperates with the others to route data to and from clients along the most efficient path. Examples of current wireless mesh network solutions may include Google Wi-Fi, Netgear Orbi™, and AirTies™ wireless mesh access points. Access points in a mesh network may operate in tandem to self-organize and self-configure using a routing algorithm such that workloads may be dynamically distributed across the network. Further, mesh networks may reconfigure routing around broken paths caused by inoperable or poorly performing access points within the network. Access points within a mesh network may transmit data to all connected access points using a broadcast function, or may transmit data to an indirectly connected access point by data hopping according to a routing function. Further, mesh networks may either have a main router or gateway device, or may be decentralized to create an ad-hoc network. An ad-hoc network does not rely on a pre-existing infrastructure, but rather, dynamically alters its infrastructure based on the routing algorithm analysis of current traffic conditions across the network. Thus, an ad-hoc wireless mesh network may alleviate spotty coverage occurring due to physical obstructions, and inefficient distribution of resources across the nodes of the network. The effectiveness of mesh networks in alleviating traffic across the network may increase as the number of nodes within the network increases. However, as the number of nodes within the network increases, so too may the likelihood of interference, and the number of hops required to reach a final destination. A solution is needed to address the potential for interference and decreases in data rates due to multiple hops across ad-hoc wireless mesh networks, while preserving the effectiveness of such networks to alleviate traffic issues.

Existing solutions to decreasing potential interference related to wireless mesh networks includes transmitting data at a plurality of frequencies, bands, or channels. Each access point or node in a network employing such a method may have multiple radio access technology (multi-RAT) capabilities such that it may receive and transmit data on a plurality of frequencies, where data communicated on each separate frequency represents an individual data link between access points. For example, gateway devices, access points, and client devices operating according to the Wi-Gig standard defined by IEEE 802.11ad may communicate via a single data link at 60 GHz having the ability to transmit up to 7 Gbit/s of data across 5G cellular networks. As another example, gateway devices, access points, and client devices accessing an ad-hoc Wi-Fi network may use the unlicensed 2.4 GHz, and 5.8 GHz channels. As yet another example, gateway devices, access points, and client devices that may operate in the future according to the next generation Wi-Fi defined by the 802.11ax standard may simultaneously provide up to eight data streams on the 5 GHz frequency, and four streams on the 2.4 GHz frequency. The IEEE 802.11ax standard further allows for transmission at the 80 GHz frequency. However, most current gateway devices and access points have a limited number of radios available for transmission and receipt of signals. For example, many current gateway devices include only four radios, and each radio may be used for either transmission or receipt of a signal on a single radio frequency.

Increasing the number of data links between access points or nodes of a network may operate to increase the overall data rate between nodes while simultaneously decreasing the incidence of interference. For example, if a single node transmitting on the 2.4 GHz frequency experiences interference from transmissions of another node or another network transmitting at the 2.4 GHz frequency, that node may instead shift to transmission in the 5 GHz frequency in order to decrease the deleterious effects of such interference. As another example, if a single node transmitting four data streams on the 2.4 GHz frequency adds another eight streams on the 5 GHz frequency, it effectively triples the total data rate between itself and a receiving node. In other words, traffic between two nodes may be decreased by increasing the number of data links between those two nodes. The use of such multi-RAT technology most effectively addresses traffic across the network by dedicating additional data links to portions of the network experiencing the highest traffic. However, because the infrastructure of ad-hoc wireless mesh networks is constantly changing, so too are traffic conditions between and among the network access points and client devices. A solution is needed to dynamically dedicate additional data links to portions of an ad-hoc wireless mesh network experiencing high traffic congestion.

The mesh network link aggregation optimization system in embodiments of the present disclosure provides such a solution by optimally and dynamically aggregating the multi-RAT links at the third layer or network layer of the open systems interconnection (OSI) model at one or more nodes or access points of the wireless network experiencing high traffic. Other terms for link aggregation may include port trunking, link bundling, network bonding, or NIC teaming. IEEE standards 802.11ax and 802.3ad provide vendor-independent link aggregation solutions. Layer-three link aggregation in embodiments of the present disclosure may involve combining a plurality of data links in parallel to increase throughput and decrease deleterious effects of potential interference. Layer-three link aggregation further alleviates the problems associated with "hopping." Because the aggregation is occurring on the network layer, each node in the chain of links between the main gateway and the client device associated with a packet need not perform the time consuming MAC address lookup that causes the data rates on each link in the chain to decrease. Instead, the data rate for a link being received at a node performing link aggregation may be equivalent to the data rate for the link being transmitted from the same node. In contrast, the data rate of both of those links would be decreased by at least half if the packet were simply "hopping" past the node.

Current wireless mesh network solutions, including Google Wi-Fi, Netgear Orbi™, and AirTies™ do not support link aggregation at the third layer or network layer. In contrast, the mesh network link aggregation optimization system in embodiments of the present disclosure may test traffic across all nodes in the network in order to determine links with a low congestion score indicating a low data rate. Such a low congestion score in embodiments may be caused by interference and/or a high number of hops in a chain. Upon determining a traffic congestion score for each link in the ad-hoc mesh network in embodiments of the present disclosure, the mesh network link aggregation optimization system may identify a link having a traffic congestion score that exceeds a preset threshold, and aggregate that link with one or more other links to increase their combined data rates, thus decreasing congestion. Such a method may then be repeated at regular intervals in order to account for changes in traffic occurring throughout the ad-hoc wireless mesh network. In such a way, the mesh network link aggregation optimization system may dynamically dedicate additional data links to portions of the ad-hoc wireless mesh network experiencing high traffic congestion at any given point.

FIG. 1 illustrates an information handling system 100 similar to information handling systems according to several aspects of the present disclosure. In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP), a base station transceiver, a wireless telephone, a land-line telephone, a control system, a camera, a scanner, a facsimile machine, a printer, a pager, a personal trusted device, a web appliance, or any other suitable machine capable of executing a set of instructions (sequential or otherwise) that specify actions to be taken by that machine, and can vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or multiple sets, of instructions to perform one or more computer functions.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Information handling system 100 can include devices or modules that embody one or more of the devices or execute instructions for the one or more systems and modules described above, and operates to perform one or more of the methods described above. The information handling system 100 may execute code instructions 124 that may operate on servers or systems, remote data centers, or on-box in individual client information handling systems according to various embodiments herein. In some embodiments, it is understood any or all portions of code instructions 124 may operate on a plurality of information handling systems 100.

The information handling system 100 may include a processor 102 such as a central processing unit (CPU), control logic or some combination of the same. Any of the processing resources may operate to execute code that is either firmware or software code. Moreover, the information handling system 100 can include memory such as main memory 104, static memory 106, computer readable medium 122 storing instructions 124 of the mesh network link aggregation optimization system 132, and drive unit 116 (volatile (e.g. random-access memory, etc.), nonvolatile (read-only memory, flash memory etc.) or any combination thereof). The information handling system 100 can also include one or more buses 108 operable to transmit communications between the various hardware components such as any combination of various input and output (I/O) devices.

As shown, the information handling system 100 may further include a video display 110. The video display 110 in an embodiment may function as a liquid crystal display (LCD), an organic light emitting diode (OLED), a flat panel display, a solid state display, or a cathode ray tube (CRT). Additionally, the information handling system 100 may include an alpha numeric input device 112, such as a keyboard, and/or a cursor control device, such as a mouse, touchpad, or gesture or touch screen input. The information handling system 100 can also include a disk drive unit 116.

The network interface device shown as wireless adapter 120 can provide connectivity to a network 128, e.g., a wide area network (WAN), a local area network (LAN), wireless local area network (WLAN), a wireless personal area network (WPAN), a wireless wide area network (WWAN), or other network. Connectivity may be via wired or wireless connection in various embodiments, however a wireless connection to network 128 is depicted. Wireless adapter 120 may include one or more radio frequency systems and subsystems in support of wireless communications. The wireless interface adapter 120 may include, for example, transmitter/receiver circuitry, modem circuitry, one or more radio frequency front end circuits 126, one or more wireless controller circuits, amplifiers, antenna systems 130 and other radio frequency subsystem circuitry 134 for wireless communications via multiple radio access technologies. Each radiofrequency front end 126, antenna system 130, and radiofrequency subsystem 134 may communicate with one or more wireless technology protocols. The radiofrequency subsystem 134 may contain individual subscriber identity module (SIM) profiles for each technology service provider and their available protocols for subscriber based radio access technologies such as cellular LTE communications. The wireless adapter 120 may also include antenna systems 130 which may be tunable antenna systems for use with the system and methods disclosed herein. In some embodiments a network interface device 120 may contain plural antenna systems 130.

In some aspects of the present disclosure, one wireless adapter 120 may operate two or more wireless links, and up to four wireless links, or one wireless link per antenna. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

In other aspects, the information handling system 100 operating as a mobile information handling system may operate a plurality of wireless adapters 120 for concurrent radio operation in one or more wireless communication bands. The plurality of wireless adapters 120 may further share a wireless communication band or operate in nearby wireless communication bands in some disclosed embodiments. Further, harmonics and other effects may impact wireless link operation when a plurality of wireless links are operating concurrently as in some of the presently described embodiments. The proximity of concurrent radio transmission or reception in a shared band or interfering bands precipitates a need to assess concurrently operating antenna systems and potentially make antenna system adjustments as necessary.

The wireless adapter 120 may operate in accordance with any wireless data communication standards. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with the WLAN standards and WWAN carriers, which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac/ad/ax (e.g., center frequencies between 5.170-5.785 GHz), and in the 60 GHz and 80 GHz bands such as 802.11ad. It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 130 for 5G small cell WWAN, Wi-Fi WLAN or WiGig connectivity and one or more additional antenna system transmitters 130 for macro-cellular communication. The radio frequency front end 126 and subsystems 134 include wireless controllers to manage signal reception, amplification, modulation/demodulation, mixing, authentication, connectivity, communications, power levels for transmission, buffering, error correction, baseband processing, and other functions of the wireless adapter 120 according to various protocols.

The radio frequency subsystems 134 of the wireless adapters may also measure various metrics relating to wireless communication pursuant to operation of an antenna optimization system as in the present disclosure. For example, the wireless controller of a radio frequency subsystem 134 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 134.

The wireless network may have a wireless mesh architecture in accordance with mesh networks described by the wireless data communications standards or similar standards in some embodiments but not necessarily in all embodiments. The wireless adapter 120 may also connect to the external network via a WPAN, WLAN, WWAN or similar wireless switched Ethernet connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

The information handling system 100 can include a set of instructions 124 that can be executed to cause the computer system to perform any one or more of the methods or computer based functions disclosed herein. For example, instructions 124 may execute a mesh network link aggregation optimization system 132, software agents, or other aspects or components. Various software modules comprising application instructions 124 may be coordinated by an operating system (OS), and/or via an application programming interface (API). An example operating system may include Windows®, Android®, and other OS types known in the art. Example APIs may include WinAPIs (e.g. Win32, Win32s, Win64, and WinCE), Core Java API, or Android APIs.

The disk drive unit 116 and the mesh network link aggregation optimization system 132 may include a computer-readable medium 122 in which one or more sets of instructions 124 such as software can be embedded. Similarly, main memory 104 and static memory 106 may also contain a computer-readable medium for storage of one or more sets of instructions, parameters, or profiles 124 including one or more multiplexer configuration scheme tables and/or one or more data stream configuration scheme tables. The disk drive unit 116 and static memory 106 also contain space for data storage. Further, the instructions 124 may embody one or more of the methods or logic as described herein. For example, instructions relating to the mesh network link aggregation optimization system and ad-hoc routing algorithms may be stored here. In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the mesh network link aggregation optimization system may be executed locally or remotely. The main memory 104 and the processor 102 also may include computer-readable media.

Main memory 104 may contain computer-readable medium (not shown), such as RAM in an example embodiment. An example of main memory 104 includes random access memory (RAM) such as static RAM (SRAM), dynamic RAM (DRAM), non-volatile RAM (NV-RAM), or the like, read only memory (ROM), another type of memory, or a combination thereof. Static memory 106 may contain computer-readable medium (not shown), such as NOR or NAND flash memory in some example embodiments. The mesh network link aggregation optimization system 132 and the drive unit 116 may include a computer-readable medium 122 such as a magnetic disk in an example embodiment. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

The information handling system 100 may also include a mesh network link aggregation optimization system 132 that may be operably connected to the bus 108. In one embodiment, the processor 102 may execute code instructions of the mesh network link aggregation optimization system 132. In other embodiments, the mesh network link aggregation optimization system 132 in an embodiment may reside outside the BIOS of the information handling system 100 and may be executed by the information handling system independently from an operating system directing operation of each antenna system. For example, the mesh network link aggregation optimization system 132 in such an embodiment may be a microcontroller operably connected to each of the antenna systems 134 to execute instructions of the front end module 126, thus eliminating the dependency on the operating system. The mesh network link aggregation optimization system 132 computer readable medium 122 may also contain space for data storage. The mesh network link aggregation optimization system 132 may perform tasks related to optimizing transmission data rates for all links across a mesh network by aggregating multiple links between any two access points within the network using a layer three link aggregation method in which links are aggregated at the network layer of the open systems interconnection (OSI) model.

In an embodiment, the mesh network link aggregation optimization system 132 may communicate with the main memory 104, the processor 102, the video display 110, the alpha-numeric input device 112, the GPS location circuit 114, and the network interface device 120 via bus 108, and several forms of communication may be used, including ACPI, SMBus, a 24 MHZ BFSK-coded transmission channel, or shared memory.

In other embodiments, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module can also include a combination of the foregoing examples of hardware or software. Note that an information handling system can include an integrated circuit or a board-level product having portions thereof that can also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another can communicate directly or indirectly through one or more intermediaries.

Figure 2:
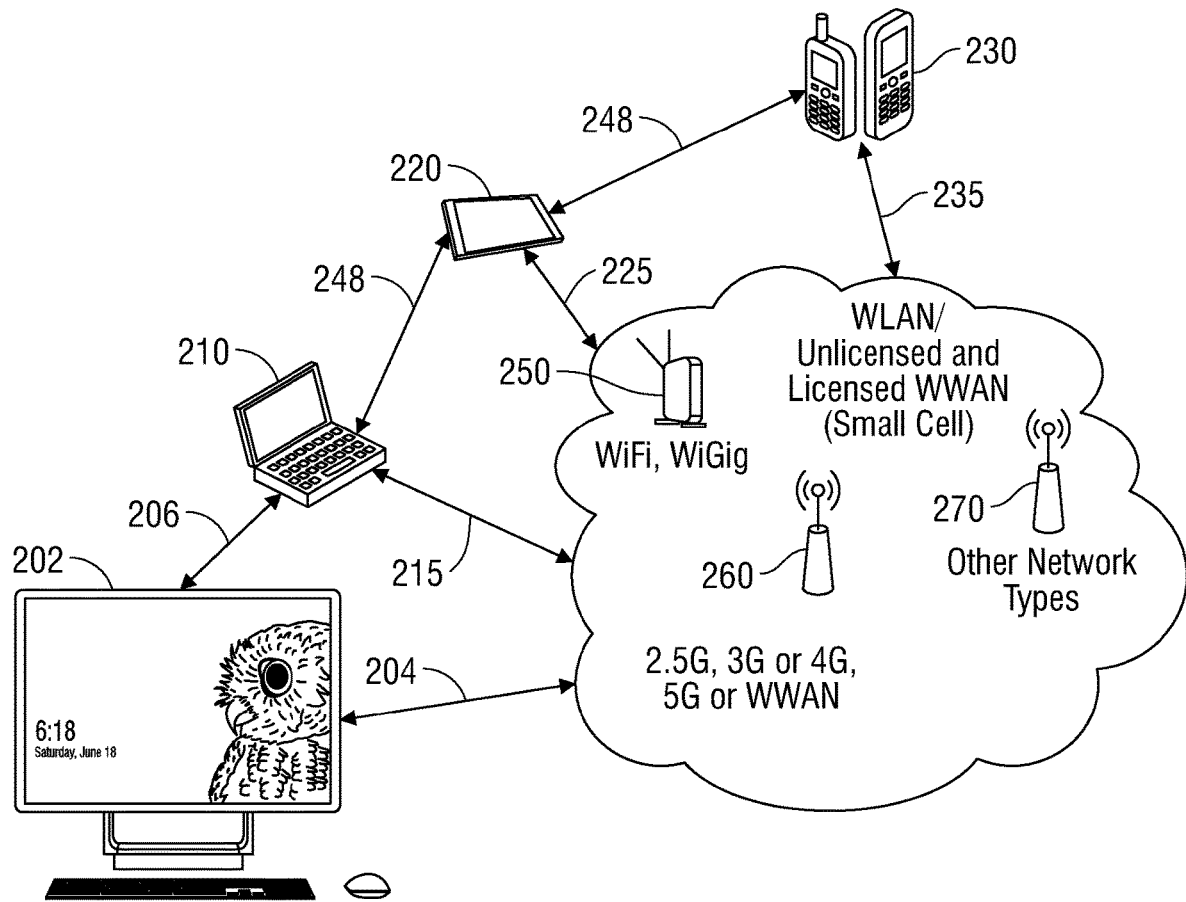
FIG. 2 illustrates a network that can include one or more information handling systems according to an embodiment of the present disclosure.

FIG. 2 illustrates a network 200 that can include one or more information handling systems operating within a mesh wireless network according to an embodiment of the present disclosure. In a particular embodiment, network 200 includes networked mobile information handling systems 210, 220, and 230, wireless network access points, information handling system 202, and multiple wireless connection link options. A variety of additional computing resources of network 200 may include client mobile information handling systems, data processing servers, network storage devices, local and wide area networks, or other resources as needed or desired. As specifically depicted, systems 202, 210, 220, and 230 may be a laptop computer, tablet computer, 360 degree convertible systems, wearable computing devices, or a smart phone device. These information handling systems 202, 210, 220, and 230 may access one or more wireless networks. For example, information handling systems 202, 210, 220, and 230 may access a wireless local network 250, a macro-cellular network 260, or other network type 270. Other network types include additional wireless local networks, additional macro-cellular networks, or even additional network types such as LPWAN networks or others. Wireless links 204, 215, 225, and 235 may be established between networked information handling systems 202, 210, 220, or 230 and one or more wireless network protocol base stations or access points for wireless local network 250, macro-cellular network 260, or other network types 270. For example, the wireless local network 240 may be the wireless local area network (WLAN), a wireless personal area network (WPAN), or a wireless wide area network (WWAN). In an example embodiment, LTE-LAA WWAN may operate with a small-cell WWAN wireless access point option. Further, a WPAN or Wi-Fi Direct connection such as 206 or 248 may be established among information handling systems 202, 210, 220, and 230 in some embodiments. Additional peer-to-peer networking protocols may be utilized in other embodiments.

Since WPAN or Wi-Fi Direct Connection 248 and WWAN networks can functionally operate similar to WLANs, they may be considered as wireless local area networks (WLANs) for purposes herein. Components of a WLAN may be connected by wireline or Ethernet connections to a wider external network. For example, wireless network access points may be connected to a wireless network controller and an Ethernet switch. Wireless communications across wireless local network 240 may be via standard protocols such as IEEE 802.11 Wi-Fi, IEEE 802.11ad WiGig, IEEE 802.15 WPAN, or emerging 5G small cell WWAN communications such as eNodeB, or similar wireless network protocols. Alternatively, other available wireless links within network 200 may include macro-cellular connections 250 via one or more service providers 260 and 270. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like.

Wireless local network 240 and macro-cellular network 250 may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 202, 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example competing protocols may be local wireless network access protocols such as Wi-Fi, WiGig, and small cell WLAN in an unlicensed, shared communication frequency band. Example communication frequency bands may include unlicensed 5 GHz frequency bands or 3.5 GHz conditional shared communication frequency bands under FCC Part 96. Wi-Fi ISM frequency bands that could be subject to future sharing include 2.4 GHz, 60 GHz, 80 GHz, 900 MHz or similar bands as understood by those of skill in the art. Within local portion of wireless network 250 access points for Wi-Fi or WiGig as well as small cell WWAN connectivity may be available in emerging 5G technology. This may create situations where a plurality of antenna systems are operating on an information handling system 202, 210, 220 or 230 via concurrent communication wireless links on both WLAN and WWAN and which may operate within the same, adjacent, or otherwise interfering communication frequency bands. Such issues may be addressed or mitigated with remedies according to the antenna optimization system of the RF front end 126 according to embodiments herein.

In an example embodiment, the cloud or remote data center or networked server may run hosted applications for systems 202, 210, 220, and 230. For example, remote data center, networked server, or some combination of both may operate some or all of an antenna optimization system including a storing and providing antenna adjustment policy to models of information handling system 100 as needed or updates of the same as disclosed in the present disclosure. The cloud or remote data center or networked server may run hosted applications for systems 202, 210, 220, and 230 by establishing a virtual machine application executing software to manage applications hosted at the remote data center in an example embodiment. Information handling systems 202, 210, 220, and 230 are adapted to run one or more applications locally, and to have hosted applications run in association with the local applications at remote data center or networked servers. For example, information handling systems 202, 210, 220, and 230 may operate some or all of the antenna optimization system or software applications utilizing the wireless links, including a concurrent wireless links, in some embodiments. The virtual machine application may serve one or more applications to each of information handling systems 202, 210, 220, and 230. Thus, as illustrated, systems 202, 210, 220, and 230 may be running applications locally while requesting data objects related to those applications from the remote data center via wireless network. In another example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. The web browser application may request web data from a host application that represents a hosted website and associated applications running at a remote data center.

Although 204, 215, 225, and 235 are shown connecting wireless adapters of information handling systems 202, 210, 220, and 230 to wireless networks 250, 260, or 270, wireless communication may link through a wireless access point (Wi-Fi or WiGig), through unlicensed WWAN small cell base stations such as in network 250 or though a service provider tower such as that shown in macrocellular network 260 or base stations or access points of other wireless network types 270. In other aspects, information handling systems 202, 210, 220, and 230 may communicate intra-device via 248 or 206 when one or more of the information handling systems 202, 210, 220, and 230 are set to act as access points or even potentially an WWAN connection via small cell communication on licensed or unlicensed WWAN connections. For example, one of information handling systems 202, 210, 220, and 230 may serve as a Wi-Fi hotspot in an embodiment. Concurrent wireless links to information handling systems 202, 210, 220, and 230 may be connected via any access points including other mobile information handling systems as illustrated in FIG. 2.

Figure 3:
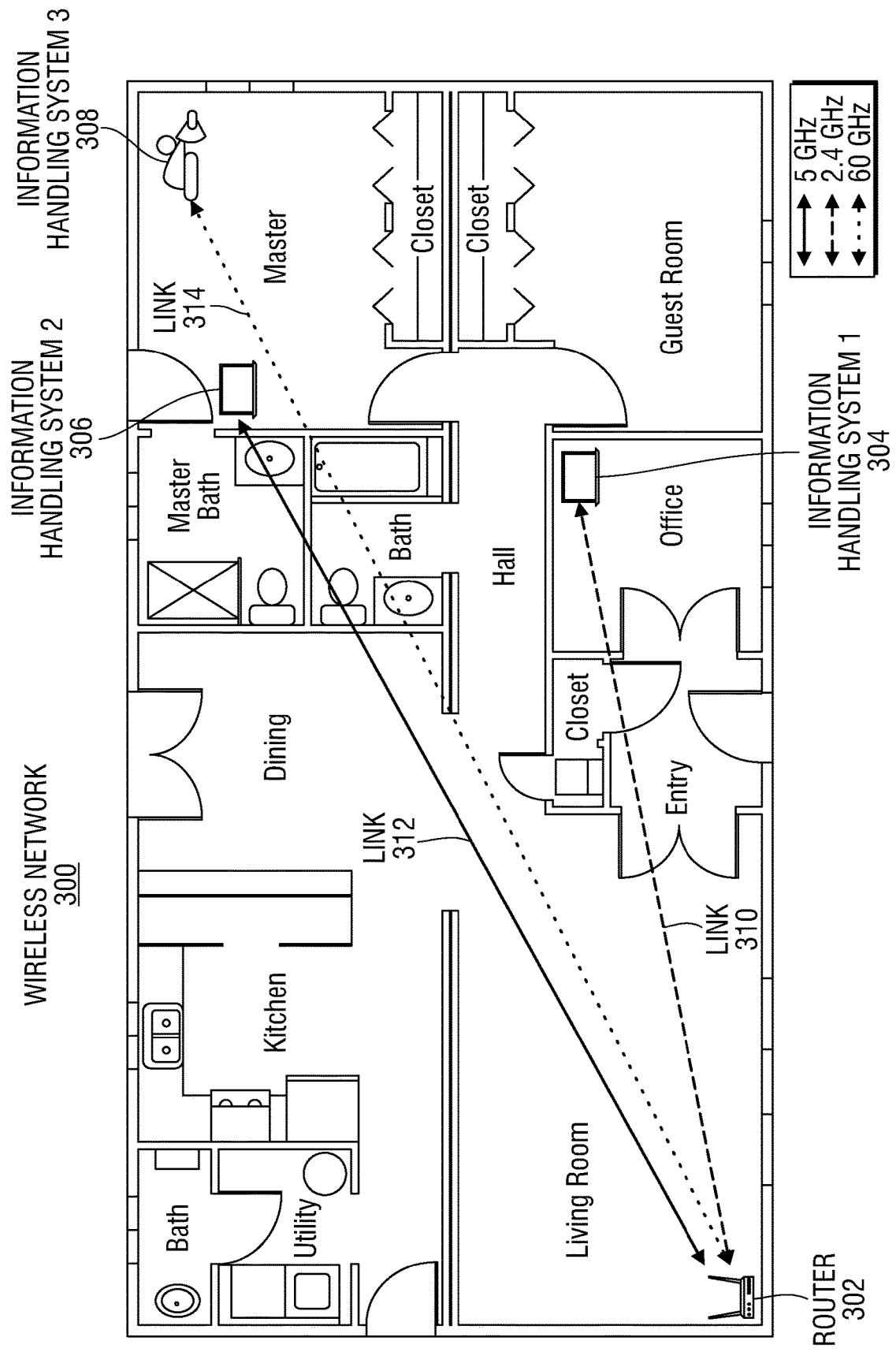
FIG. 3 is a block diagram illustrating a home wireless network according to an embodiment of the present disclosure.

FIG. 3 is a block diagram illustrating a home wireless network using multi-RAT technology according to an embodiment of the present disclosure. The home wireless network 300 may be a mesh network or a hierarchical network connecting a router 302 with a first information handling system 304, a second information handling system 306, and a third information handling system 308. In an embodiment in which the network 300 is a hierarchical network, the router 302 may be a gateway device receiving access to a broader network (e.g. Ethernet) via a wired connection to a port outside the home depicted in FIG. 3. In an embodiment in which the network 300 is a mesh network, the router 302 may be a gateway device, or may be one of a plurality of nodes or access points (not shown), where each node may be capable of transmitting and receiving wireless data links. The mesh network in such an embodiment may be centralized, such that the routes between nodes within the mesh network are fixed, and known (in contrast to an ad-hoc network).

The first and second information handling systems 304 and 306 in an embodiment may be, for example, laptop or tablet computing devices, desktop computing devices, smart televisions. The third information handling system 308 in an example embodiment may be a virtual reality (VR) or augmented reality (AR) wearable headset. In other embodiments, the first, second, and third information handling systems 304-308 may be, for example, a mobile device (e.g., personal digital assistant (PDA) or smart phone), server (e.g., blade server or rack server), a consumer electronic device, a network server or storage device, a network connected device (cellular telephone, tablet device, etc.), IoT computing device, wearable computing device, a set-top box (STB), a mobile information handling system, a palm-top computer, a control system, a camera, a scanner, a facsimile machine, a printer, or a web appliance.

The router 302 in an embodiment may be capable of multi-RAT communications. For example, the router 302 may be capable of communications conforming to the IEEE 802.11ad Wi-Gig standard, which allows for simultaneous transmission on the 2.4 GHz, 5 GHz, and 60 GHz frequencies. In other embodiments, the router 302 may be capable of communications conforming to IEEE 802.11 standards more recent than the Wi-Gig standard. The router 302 may connect wirelessly to each of the first, second, and third information handling systems 304-308 using one of these three available frequencies. For example, The router 302 in an embodiment may transmit to the first information handling system 304 via a wireless link 310 at the 2.4 GHz frequency, to the second information handling system 306 via a wireless link 312 at the 5 GHz frequency, and to the third information handling system 308 via a wireless link 314 at the 60 GHz frequency. The router 302 may split the data rate it receives among each of the outgoing wireless links. For example, if the router 302 receives data at a data rate of 800 Mbps, it may divide this data rate amongst the links 310-314. Thus, the router 302 may be capable of transmitting on the link 310 at 200 Mbps, on the link 312 at 400 Mbps, and on the link 314 at 200 Mbps, for a combined 800 Mbps.

However, the strength of the wireless signal may degrade between transmission from the router 302 and receipt of the signal at one or more of the first, second, or third information handling systems 304-308 in an embodiment. For example, the links 312 and 314 may pass through a bathroom area in order to reach the second and third information handling systems 306-308. The pipes and water within the walls of the bathroom through which these links 312-314 must pass in order to reach the second and third information handling systems 306 and 308 in an embodiment may cause significant interference and/or diffraction of the links 312-314, such that the signals received at the second and third information handling systems 306 and 308 are significantly degraded. As another example, the distance between the router 302 and the third information handling system 308 in an embodiment may be too great for efficient receipt of signals transmitted at the 60 GHz frequency, which has a smaller range than the 2.4 GHz and 5 GHz bandwidths. In other words, the placement of the router 302 in FIG. 3 may cause a spotty coverage area or dead zone within the master bedroom in which the second and third information handling systems 306 and 308 are placed. A solution is needed to automatically overcome such an impediment.

Figure 4:
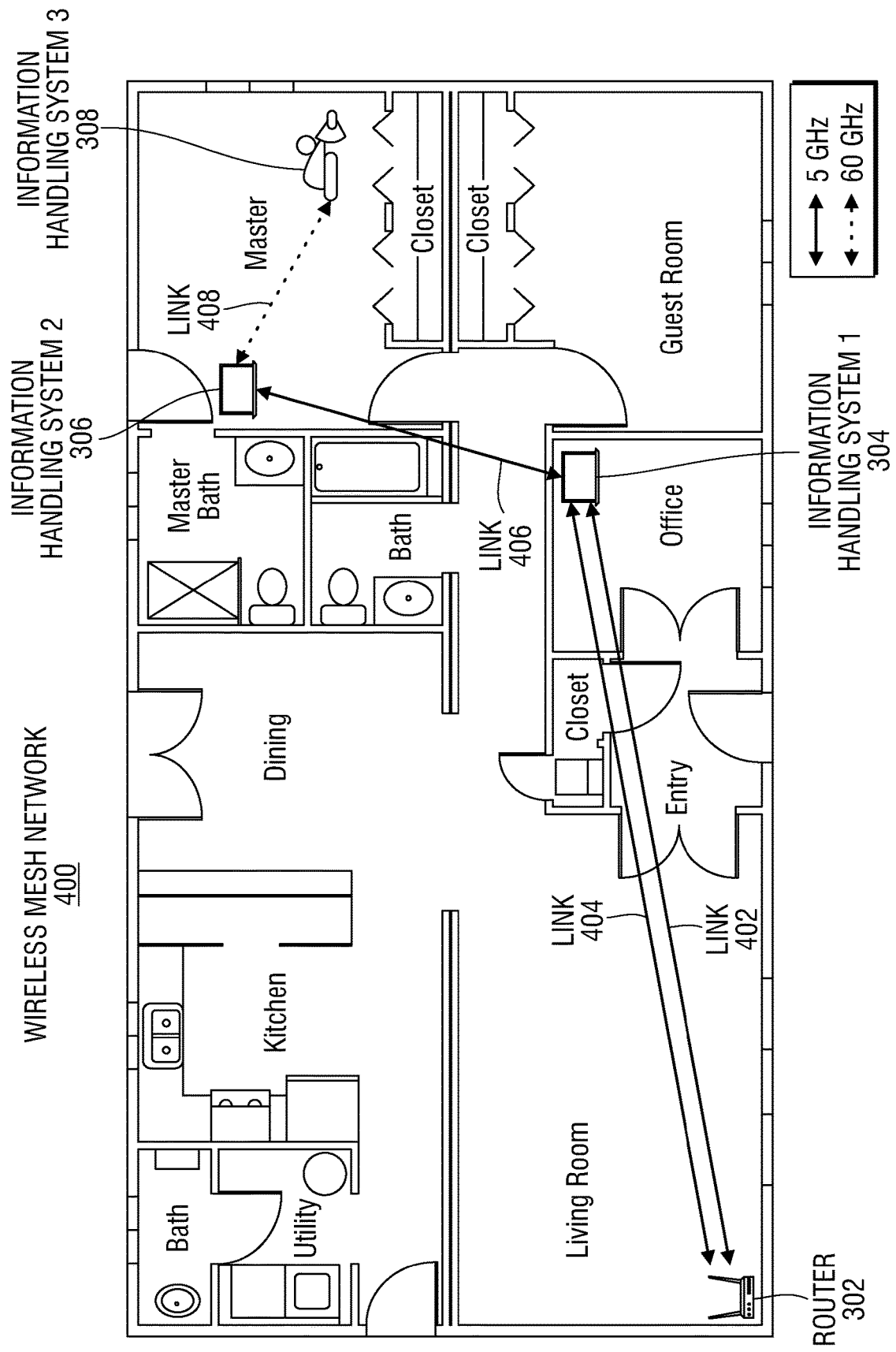
FIG. 4 is a block diagram illustrating a link-aggregated home wireless mesh network according to an embodiment of the present disclosure.

FIG. 4 is a block diagram illustrating a link-aggregated home wireless mesh network using multi-RAT technology according to an embodiment of the present disclosure. The wireless mesh network 400 may employ a mesh network link aggregation optimization system to overcome the impediments described above with respect to FIG. 3. The mesh network link aggregation optimization system in an embodiment may operate partially onboard the router 302, the first information handling system 304, the second information handling system 306, and/or the third information handling system 308, in order to allow each of the information handling systems 304-308 to act as a node within the mesh network 400. By transforming the wireless network to a mesh wireless network, and/or by giving each of the information handling systems 304-308 the capability to act as nodes within the wireless mesh network 400, each of the router 302 and the information handling systems 304-308 may cooperate in an embodiment with the others to route data to and from one another along the most efficient path.

For example, the mesh network link aggregation optimization system in an embodiment may operate to allow the first information handling system 304 to operate as a node in the wireless mesh network 400 in order to overcome interference caused by the bathroom plumbing when the router 302 transmits directly to the second information handling system 306, or when the router 302 transmits directly to the third information handling system 308. By operating the first information handling system 304 as a node in the wireless network 400, a clear line of sight is established between the second information handling system 306 and the first information handling system 304 acting as a node in the network 400. In such an embodiment, the first information handling system 304 may also transmit data directly to the third information handling system 308, or may transmit data to the third information handling system 308 via the second information handling system 306. Because the range of transmissions at the 60 GHz frequency is significantly limited, and because the second information handling system 306 is closer to the third information handling system 308 than the first information handling system 304, it may be more efficient to transmit data to the third information handling system 308 via the second information handling system 306. The mesh network link aggregation optimization system in such an embodiment may further cause the second information handling system 306 to operate as a node in the wireless network 400.

In a traditional multi-RAT mesh network that does not use link aggregation, transmission of data through more than one node of the wireless mesh network 400 may employ a hopping method. Transmission of data between any two nodes of the mesh network may constitute a single hop. For example, the transmission of data from the router 302 to the first information handling system 304 may constitute a first hop, and the transmission of that data from the first information handling system 304 to the second information handling system 306 may constitute a second hop. As another example, the transmission of data from the router 302 to the first information handling system 304 may constitute a first hop, the transmission of that data from the first information handling system 304 to the second information handling system 306 may constitute a second hop, and the transmission of the data from the second information handling system 306 to the third information handling system 308 may constitute a third hop.

The capacity or data rate of each link in a hopping path may decrease as the number of hops increases. For example, the data rate for each hop may be limited to a maximum of the inverse of the number of hops. Because the transmission of data between the router 302 and the second information handling system 306 includes two hops, the maximum data rate for each of those two hops is limited to the maximum data rate the router 302 is capable of transmitting, divided by the number of hops (e.g. two). In other words, if the router 302 is capable of transmitting a maximum of 400 Mbps for use at the second information handling system 306, and a two-hop method is used, the data rate actually received at the second information handling system 306 would be 200 Mbps. Similarly, if the router 302 is capable of transmitting a maximum of 200 Mbps for use at the third information handling system 308, and a three-hop method is used to deliver that data, the data rate actually received at the third information handling system 308 would be 66.67 Mbps. Depending on the degree of interference caused by the bathroom plumbing, these received data rates may actually be lower than the data rate of signals received directly from the router 302 (as described above with reference to FIG. 3), even though those signals are undergoing considerable interference.

In order to overcome the degradation of data rate caused by multiple hops in a mesh network, the mesh network link aggregation optimization system in an embodiment may aggregate one or more links at the network layer at one or more nodes of the wireless mesh network 400. Layer-three link aggregation operates to remove the decrease in data rate associated with multiple hops through a wireless mesh network. For example, the mesh network link aggregation optimization system in an embodiment may aggregate the data routed for delivery at the first information handling system 304 and the third information handling system 308 into a single link. For example, in an embodiment described with reference to FIG. 3, the data routed to the first information handling system 304 may be transmitted via the first wireless link 310 at a data rate of 200 Mbps, and the data routed to the third information handling system may be transmitted via the third wireless link 314 at a data rate of 200 Mbps. However, as described above, the router 302 may not be capable of transmitting directly to the third information handling system 308 at the 60 GHz frequency because of the distance between the devices.

In an embodiment described with reference to FIG. 4, the wireless mesh network link aggregation optimization system may connect the router 302 and the first information handling system 304 via layer-three aggregated links 402 and 404. Links 402 and 404 may both be transmitted on the 5 GHz band, and may each have a data rate of 400 Mbps. Thus, the first information handling system 304 in such an embodiment may receive data at a combined data rate of 800 Mbps. The first information handling system 304 in such an embodiment may then transmit data to the second information handling system 306 via link 406 on the 5 GHz band at a data rate of 800 Mbps. The second information handling system 306 in such an embodiment may then transmit data to the third information handling system 308 via link 408 on the 60 GHz band at a data rate of 800 Mbps. By aggregating links at the second information handling system 306, the second information handling system 306 may be capable of transmitting at the full 800 Mbps data rate received on the link 406 for transmission to the third information handling system 308, as if transmission from the first information handling system 304 to the second information handling system 306 did not constitute a hop in a delivery method. In such a way, the mesh network link aggregation optimization method in an embodiment may increase the data rate of links experiencing high congestion (e.g. low data rates) by aggregating such links with one or more other links at the third layer of the OSI model.

Figure 5:
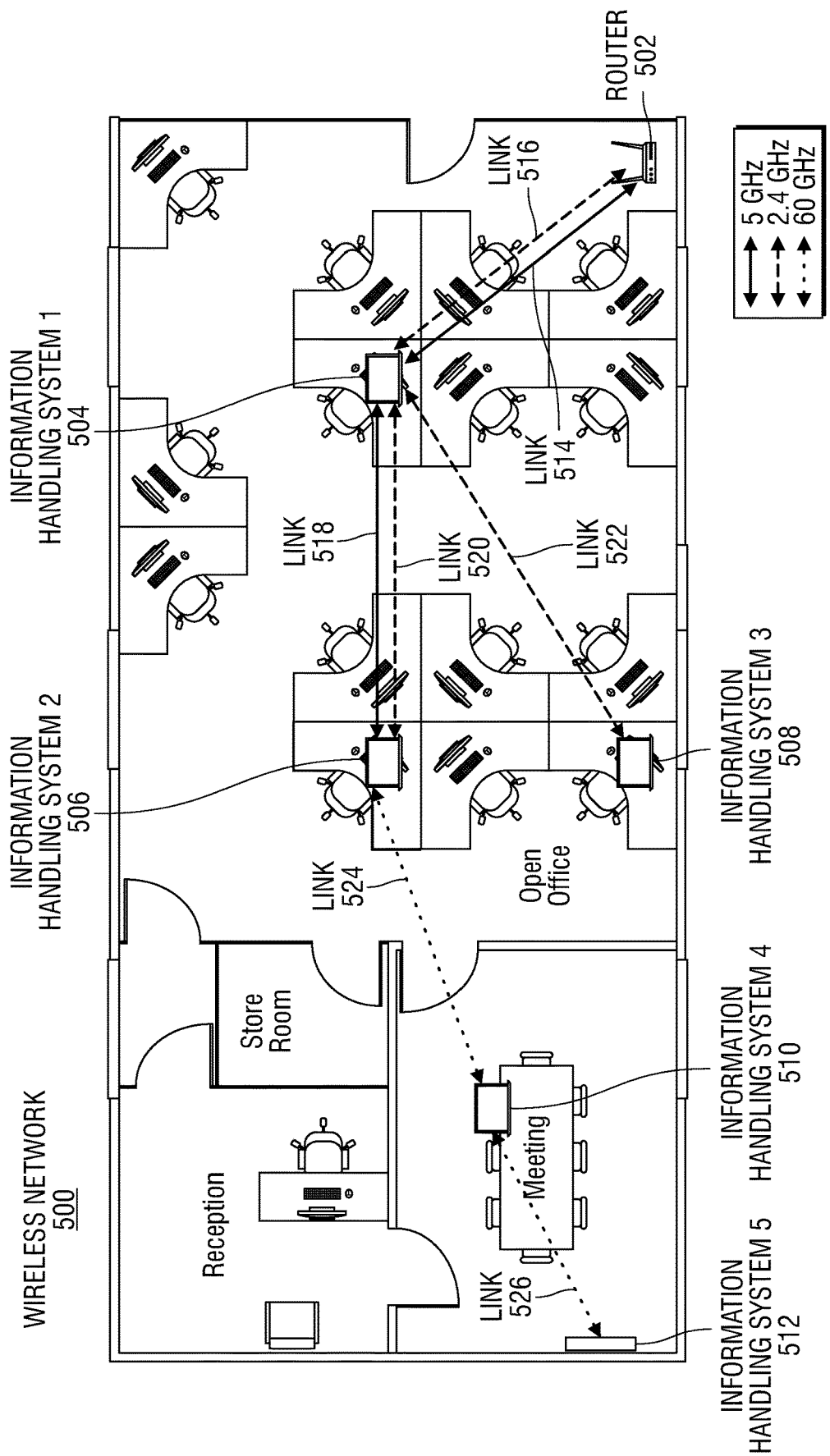
FIG. 5 is a block diagram illustrating a shared radio configuration for an office wireless network according to an embodiment of the present disclosure.

FIG. 5 is a block diagram illustrating a shared radio configuration for a small office wireless network using layer three link aggregation technology according to an embodiment of the present disclosure. The small office wireless network 500 may be a mesh network connecting a router 502 with one or more information handling systems within the network 500. The network 500 in an embodiment may include a first information handling system 504, a second information handling system 506, a third information handling system 508, a fourth information handling system 510, and a fifth information handling system 512. The router 502 in an embodiment may be a multi-RAT gateway device, or may be an edge node or access point of a larger mesh network (not shown), where each node in the larger network may be capable of transmitting and receiving wireless data links. The mesh network 500 may be capable of functioning in an ad-hoc architecture. Further, the router 502 and each of the first through fifth information handling systems 504-512 in an embodiment may have up to four separate radios. In some embodiments, each of the radios may be capable of being dedicated to transmitting at 2.4 GHz, receiving at 2.4 GHz, transmitting at 5 GHz, receiving at 5 GHz, transmitting at 60 GHz, or receiving at 60 GHz. Other operating frequency bands are also contemplated which may be relevant to the mesh network operation. In other words, the maximum number of signals both received and transmitted from each of the router 502 and the first through fifth information handling system 504-512 may not exceed four in example embodiments. In other embodiments, the number of radios at each access point such as a router 502 or information handling systems 504-512 in the wireless network 500 may be a number other than four including greater than four, and the number of radios at each access point may vary from access point to access point or by information handling system.

In an example embodiment in which each radio includes a maximum of four radios, the router 502 may transmit two signals, including a link 514, and a link 516. The router 502 in such an embodiment may transmit both the links 514 and 516 to the first information handling system 504. The link 514 in an embodiment may be transmitted in the 5 GHz band, and may have a maximum data rate of 800 Mbps. The link 516 in an embodiment may be transmitted in the 2.4 GHz band, and may have a maximum data rate of 600 Mbps. In such a way, the first information handling system 504 may receive a total maximum of 1400 Mbps. The router 502 in such a configuration may utilize only two of four available radios.

The first information handling system 504 in an embodiment may transmit three links via two radios. For example, the first information handling system 504 may transmit data to the second information handling system 506 via the link 518 on the 5 GHz band at a maximum data rate of 800 Mbps. Because the first information handling system 504 has used three of its four available radios to receive the links 514 and 516, and transmit the link 518, it only has one radio left available for further transmission. As such, the first information handling system may transmit both the link 520 and the link 522 via the fourth radio, and split the data rate the fourth radio is capable of transmitting between the links 520 and 522. Thus, the first information handling system 504 may transmit the link 520 to the second information handling system 506 on the 2.4 GHz band at a maximum data rate of 300 Mbps, and may transmit the link 522 to the third information handling system 508 on the 2.4 GHz band at a maximum data rate of 300 Mbps. In such a way, the second information handling system 506 may receive a maximum of 1100 Mbps, and the third information handling system 508 may receive a maximum of 300 Mbps. The assignment of two links to a single radio in an embodiment may be referred to herein as a shared radio. The use of a shared radio across two different links may cause a congestion score for each link to decrease, indicating higher congestion on each link.

The second information handling system 506 in an embodiment may then transmit data to the fourth and fifth information handling systems 512 in a hopping mode. For example, the second information handling system 506 may transmit data to the fourth information handling system 510 via the link 524, and the fourth information handling system 512 may transmit data to the fifth information handling system 512 via the link 526. Because a hopping mode is used to transmit data from the fourth 510 to the fifth information handling system 512, the data rates for each of link 524 and link 526 may be equivalent, at maximum, to half the data rate received at the second information handling system 506. Thus, the second information handling system 506 may transmit data to the fourth information handling system 510 via the link 524 on the 60 GHz band at a maximum data rate of 550 Mbps, and the fourth information handling system 510 may transmit data to the fifth information handling system 512 via the link 526 on the 60 GHz band at a maximum data rate of 550 Mbps. One or more links in such an embodiment may undergo interference or traffic bottlenecks that result in transmission of data at data rates significantly lower than the maximum data rate.

Figure 6:
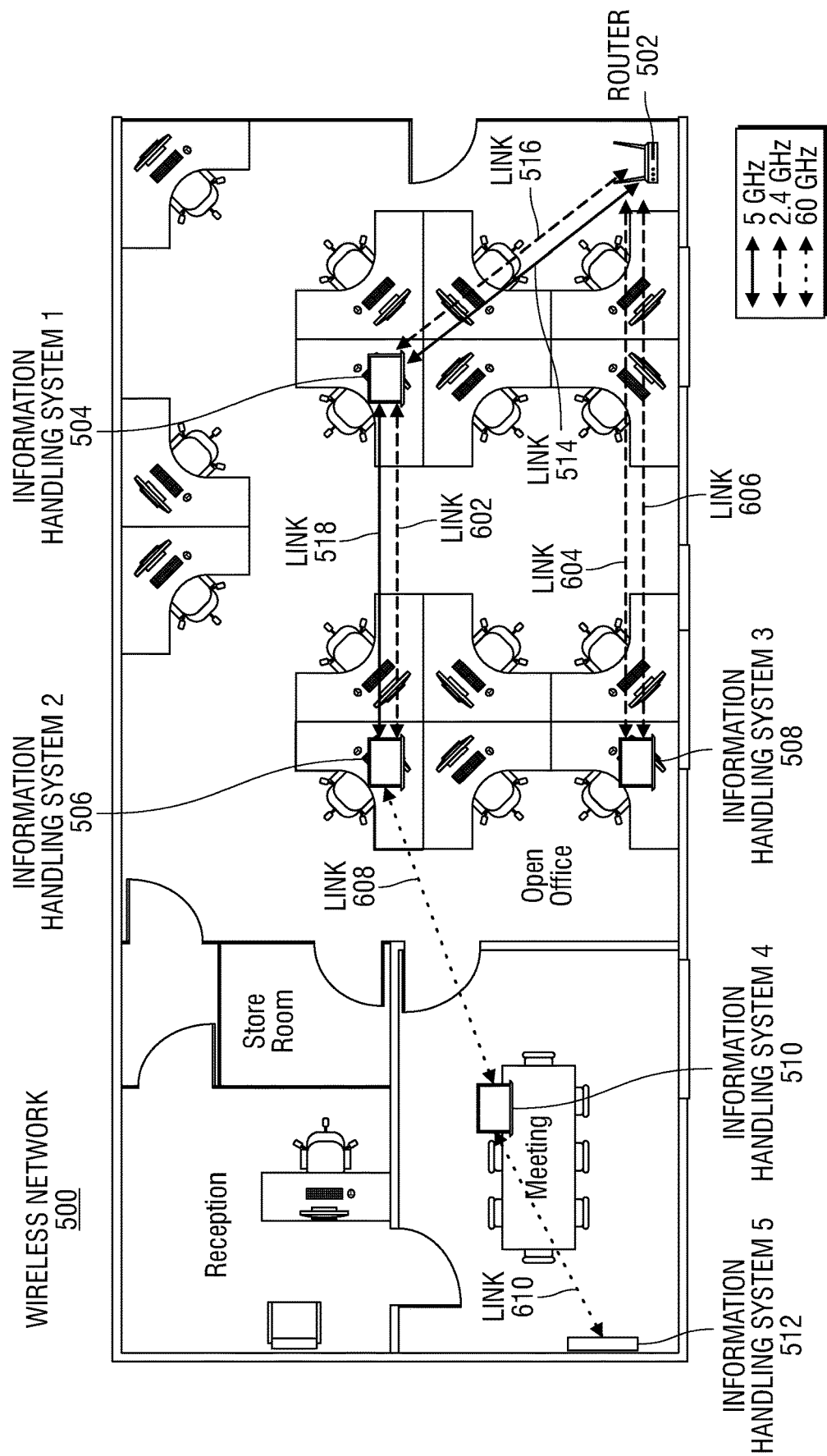
FIG. 6 is a block diagram illustrating multiple upstream link aggregations for an office wireless network according to an embodiment of the present disclosure.

FIG. 6 is a block diagram illustrating multiple upstream link aggregations for a small office wireless network using layer three link aggregation technology according to an embodiment of the present disclosure. FIG. 6 depicts the wireless network 500 described above with reference to FIG. 5 placed in a configuration employing layer three link aggregation rather than shared radios at the first information handling system 504. For example, the first information handling system 504 in such an embodiment may receive data from the router 502 via the links 514 and 516, but may not transmit data directly to the third information handling system 508. In other words, the first information handling system 504 in such an embodiment may not need to share the 2.4 GHz transmitting radio among two separate nodes, as depicted in FIG. 5 (e.g. splitting the data rate between the links 520 and 522). Thus, the first information handling system 504 depicted in FIG. 6 may transmit data to the second information handling system 506 via a link 602 on the 2.4 GHz band at a maximum data rate of 600 Mbps. The second information handling system 506 in such an embodiment may then receive data a total maximum data rate of 1400 Mbps (800 Mbps at 5 GHz on the link 518 plus 600 Mbps at 2.4 GHz on the link 602), rather than at a maximum of 1100 Mbps as in the configuration employing radio sharing.

As described above, in the data sharing configuration of FIG. 5 the router 502 only employs two of its four available radios. In FIG. 6, one or both of the two remaining radios may be employed to transmit data to the third information handling system 508. In one example embodiment, the router 502 may establish only link 604 on the 2.4 GHz band to transmit and receive data to and from the third information handling system 508. In such an embodiment, the link 604 may be capable of transmitting via a maximum bandwidth of 600 Mbps, which may be significantly higher than the 300 Mbps maximum data rate achievable by the network configuration of FIG. 5. In another example embodiment, the router 502 may establish both aggregated links 604 and 606. The link 604 and the link 606 may be transmitted on the 2.4 GHz band, and using a layer three link aggregation method, the data rate of both of these streams may be combined in order to receive data at a higher total maximum data rate at the third information handling system 508 than would be received using only one link at the 2.4 GHz band. For example, if the link 604 and the link 606 encountered little or no interference, such that they achieved the highest theoretical data rates for the 2.4 GHz band, both the link 604 and the link 606 may have a data rate of 600 Mbps. Thus, the third information handling system 508 in such an embodiment may receive a total maximum of 1200 Mbps. As another example, in an embodiment in which the link 604 and the link 606 encountered a large degree of interference (e.g. from a nearby network using the same 2.4 GHz band), the link 604 and link 606 may only realistically achieve a data rate of 100 Mbps, far below the maximum theoretical data rate. In such an embodiment, the third information handling system 508 may receive a total of 200 Mbps. Further, in such an embodiment, the link 604 and link 606 may be associated with a high congestion score as a result of the interference experienced.

In an embodiment in which the second information handling system 506 transmits data to the fourth and fifth information handling systems 510 and 512 in a hopping mode, the second information handling system 506 may transmit data to the fourth information handling system 510 via the link 608, and the fourth information handling system 512 may transmit data to the fifth information handling system 512 via the link 610. Because a hopping mode is used to transmit data from the fourth 510 to the fifth information handling system 512, the data rates for each of links 608 and 610 may be equivalent, at maximum, to half the data rate received at the second information handling system 506. Thus, the second information handling system 506 may transmit data to the fourth information handling system 510 via the link 608 on the 60 GHz band at a maximum data rate of 700 Mbps, and the fourth information handling system 510 may transmit data to the fifth information handling system 512 via the link 610 on the 60 GHz band at a maximum data rate of 700 Mbps.

In a first embodiment in which the link 604 and the link 606 encounter little or no interference and are associated with a high congestion score (indicating little or no congestion), the third information handling system 508 may receive a total maximum of 1200 Mbps, and the fifth information handling system 512 may receive a total maximum of 700 Mbps. In a second embodiment in which the link 604 and the link 606 encounter a large degree of interference and are associated with a low congestion score, the third information handling system 508 may only receive a total of 200 Mbps, while the fifth information handling system 512 receives a total of 700 Mbps. Thus, the choice of whether to employ a layer-three link aggregation configuration at a particular node within a network may depend upon the resulting congestion score.

Figure 7:
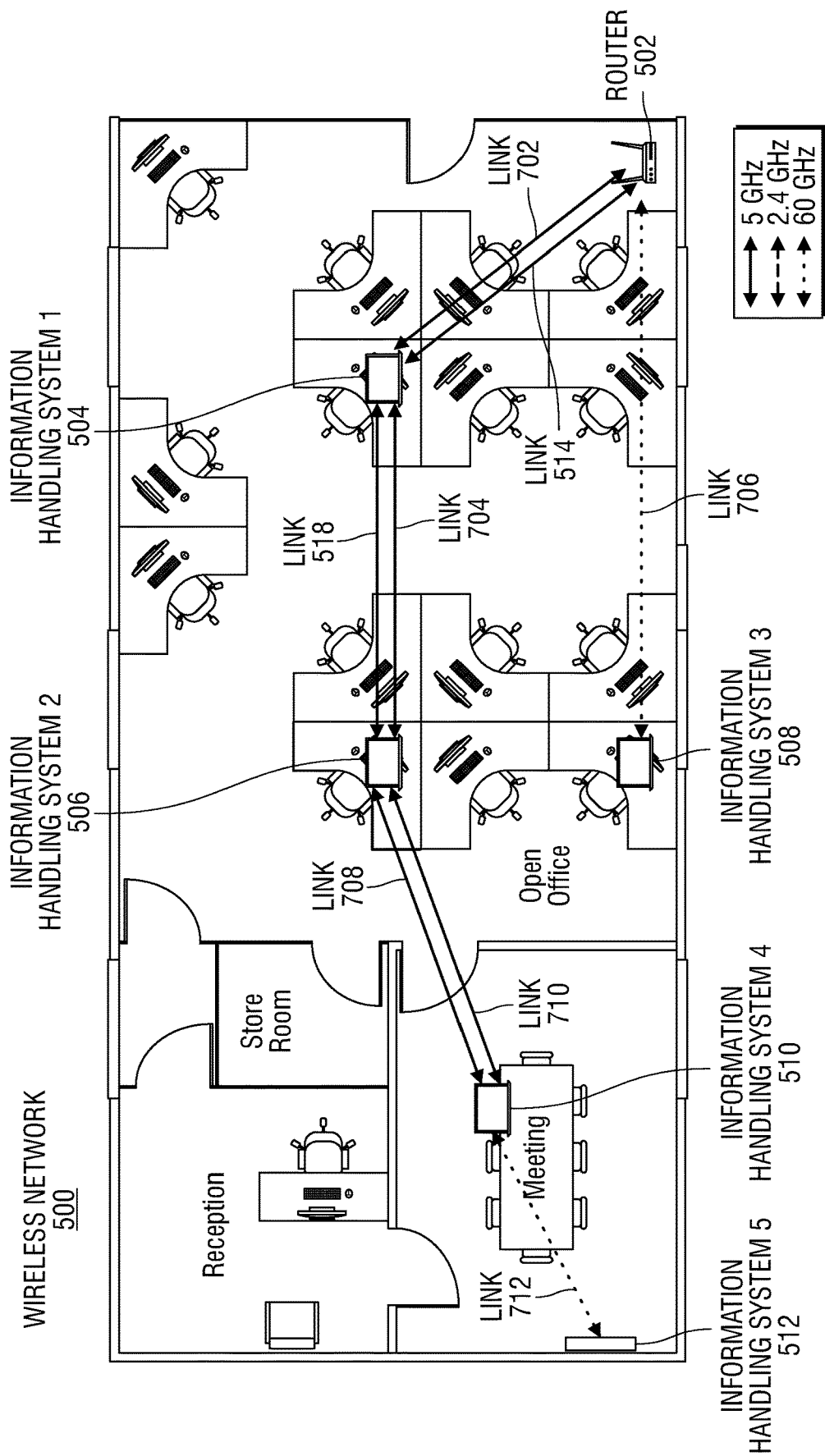
FIG. 7 is a block diagram illustrating multiple downstream link aggregations for an office wireless network according to an embodiment of the present disclosure.

FIG. 7 is a block diagram illustrating multiple downstream link aggregations for a small office wireless network using layer three link aggregation technology according to an embodiment of the present disclosure. FIG. 7 depicts the wireless network 500 described above with reference to FIGS. 5 and 6, placed in a configuration employing layer three link aggregation rather than shared radios at the first information handling system 504, as depicted in FIG. 5. The configuration depicted in FIG. 7 further employs link aggregation both upstream and downstream from the first information handling system 504.

For example, the router 502 may transmit data to the first information handling system 504 via layer three aggregated links 702 and 704 on the 5 GHz band at a maximum data rate of 800 Mbps per link. In such a way, the first information handling system 504 may receive data at a maximum data rate of 1600 Mbps. The router 502 may also transmit data to the third information handling system 508 via link 708 in the 60 GHz band at a maximum data rate of 1 Gbps.

The second information handling system 506 in an embodiment may receive data from the first information handling system 504 via layer three aggregated links 518 and 704, both transmitting in the 5 GHz band. The maximum data rate of aggregated links 518 and 704 in such an embodiment may each be 800 Mbps, such that the second information handling system 506 receives data at a maximum data rate of 1600 Mbps.

The second information handling system 506 in such an embodiment may use a layer-three link aggregation method to transmit data to the fourth information handling system 510 via both links 708 and 710. For example, the second information handling system 506 in an embodiment may transmit data to the fourth information handling system 510 via link 708 on the 5 GHz band at a data rate of 800 Mbps and via link 710, also on the 5 GHz band at a data rate of 800 Mbps, such that the fourth information handling system 510 receives data at a combined data rate of 1600 Mbps.

As described herein, the use of layer-three link aggregation alleviates the decrease in data rates for each link in a chain associated with hops. As such, the fourth information handling system 510 may transmit data at the same data rate as it receives data. As a consequence, the fourth information handling system 510 in an embodiment may transmit data via link 712 on the 60 GHz band at a rate of 1 Gbps, which is the maximum allowable data rate for the 60 GHz frequency, according to the IEEE 802.11ad standard. Thus, by aggregating links between the second and fourth information handling systems 506 and 510 in an embodiment, the mesh network link aggregation optimization system in an embodiment may increase the data rate for transmissions received at the fifth information handling system 512 from 550 Mbps achieved by the configuration of FIG. 5 or from 700 Mbps achieved by the configuration of FIGS. 6 to 1 Gbps.

Figure 8:
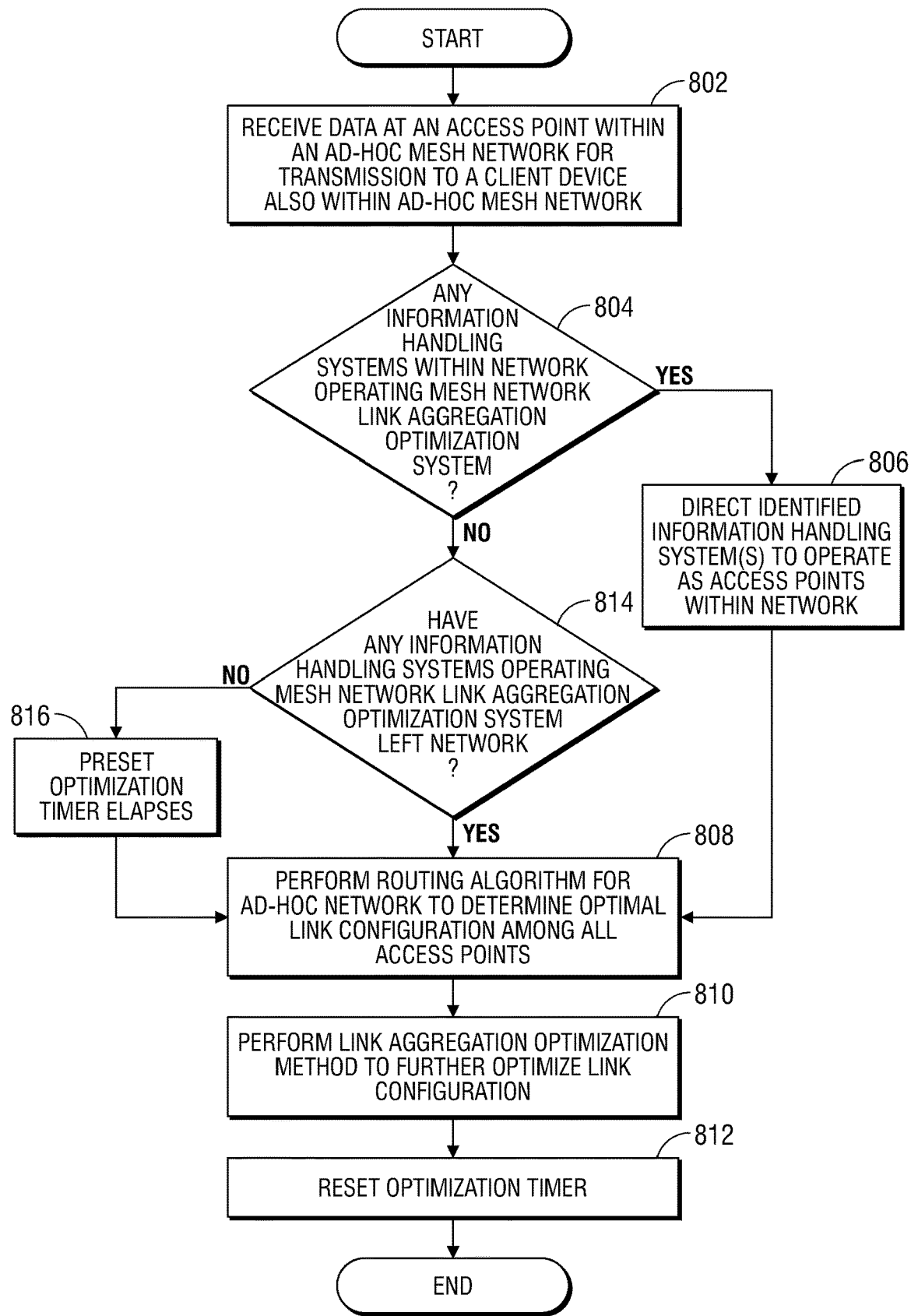
FIG. 8 is a flow diagram illustrating a method for configuring optimal link aggregation and routing across a mesh network according to an embodiment of the present disclosure.

FIG. 8 is a flow diagram illustrating a method for configuring optimal link aggregation and routing across a mesh network based on congestion scores across the network according to an embodiment of the present disclosure. The mesh network configured according to the method of FIG. 8 may be an ad-hoc mesh network capable of executing a routing algorithm to dynamically optimize routes between multiple access points in the mesh network. At block 802, data may be received at an access point within an ad-hoc mesh network for transmission to a client device also within the ad-hoc mesh network. For example, in an embodiment described with reference to FIG. 4, data may be received at the router 302 within the ad-hoc mesh network 400 for transmission to one or more of the first, second, or third information handling systems 304-308. As another example, in embodiments described with reference to FIGS. 6 and 7, data may be received at the router 502 within the ad-hoc mesh network 500 for transmission to one or more of the first, second, third, fourth, or fifth information handling systems 504-512.

The mesh network link aggregation optimization system in an embodiment may determine at block 804 whether any information handling systems within the network are capable of executing code instructions of the mesh network link aggregation optimization system. For example, in an embodiment described with reference to FIG. 4, the mesh network link aggregation optimization system may determine that the first, second, and third information handling systems 304-308 within the network 400 are capable of executing code instructions of the mesh network link aggregation optimization system, such that each of systems 304-308 may operate as access points within the network rather than as endpoint client devices. As another example, in embodiments described with reference to FIGS. 6 and 7, the mesh network link aggregation optimization system may determine that the first, second, third, fourth, and fifth information handling systems 504-512 within the network 500 are capable of executing code instructions of the mesh network link aggregation optimization system, such that each of systems 304-308 may operate as access points within the network rather than as endpoint client devices.

The mesh network link aggregation optimization system may determine whether any information handling systems within the network are capable of executing code instructions of the mesh network link aggregation optimization system by, for example, transmitting a broadcast request from the router 502 for such information to all information handling systems and/or nodes within the mesh network. Information handling systems operating mesh network link aggregation optimization systems in an embodiment may respond to such a received broadcast request by transmitting a response back to the router 502 identifying itself by its MAC address (layer two identification) or by its current IP address (layer three identification). In an embodiment in which the mesh network link aggregation optimization system determines one or more information handling systems within the network are capable of executing code instructions of the mesh network link aggregation optimization system, the method may proceed to block 806.

In contrast, in an embodiment described with reference to FIG. 3, the mesh network link aggregation optimization system may determine that the first, second, and third information handling systems 304-308 within the network 300 are not capable of executing code instructions of the mesh network link aggregation optimization system, forcing each of systems 304-308 to receive data via a link directly between that system and the router 302. In such an embodiment in which the mesh network link aggregation optimization system determines none of the information handling systems within the network are capable of executing code instructions of the mesh network link aggregation optimization system, the method may proceed to block 814.

At block 806, the mesh network link aggregation optimization system in an embodiment may direct the information handling systems identified at block 804 to operate as access points within the network. For example, in an embodiment described with reference to FIG. 4, by transforming the wireless network to a mesh wireless network, and/or by giving each of the information handling systems 304-308 the capability to act as nodes within the wireless mesh network 400, each of the router 302 and the information handling systems 304-308 may cooperate in an embodiment with the others to route data to and from one another along the most efficient path.

For example, by operating the first information handling system 304 as a node in the wireless network 400, a clear line of sight is established between the second information handling system 306 and the first information handling system 304 acting as a node in the network 400 such that interference caused by the bathroom plumbing can be overcome. As another example, operating the first and second information handling systems 304 and 306 as nodes in the wireless network 400 in an embodiment may overcome the problems associated with transmitting a link in the 60 Ghz band across the lengthy distance between the router 302 and the third information handling system 308.

The mesh network link aggregation optimization system may perform the routing algorithm for ad-hoc network in an embodiment at block 808 to determine the optimal link configuration among all access points within the network. For example, in an embodiment described with reference to FIG. 4, the mesh network link aggregation optimization system may perform the routing algorithm to determine the optimal link configuration among the router 302, and the first, second, and third information handling systems 304-308 that results in the most efficient transmission of data between each of those access points. The mesh network link aggregation optimization system in an embodiment may employ a known routing algorithm for ad-hoc networks, such as an optimized link state routing algorithm. In other embodiments, the mesh network link aggregation optimization system may employ a distance vector algorithm, a path vector protocol, or a link state routing algorithm. Still other embodiments may involve the use of dynamic routing protocols such as routing information protocol, open shortest path first, and enhanced interior gateway routing protocol. The routing protocol used in an embodiment may operate to identify and "heal" broken links or to route around bottlenecks or high-interference obstacles.

At block 810, the mesh network link aggregation optimization system in an embodiment may perform a link aggregation optimization method to further optimize link configurations among the access points and client devices within an ad-hoc network that has undergone the routing optimization of block 808. In a traditional multi-RAT mesh network that does not use link aggregation, transmission of data through more than one node of the wireless mesh network 400 may employ a hopping method, causing the data rate of each link in a hopping path to decrease. In order to overcome the degradation of data rate caused by multiple hops in a mesh network, the mesh network link aggregation optimization system in an embodiment may aggregate one or more links at the network layer at one or more nodes of the wireless mesh network 400. Layer-three link aggregation operates to remove the decrease in data rate associated with multiple hops through a wireless mesh network. Identification of one or more access points within the network at which application of link aggregation may increase the efficiency of communications across the network is described in greater detail with reference to FIG. 9.

The mesh network link aggregation optimization system in an embodiment may reset an optimization timer at block 812. The mesh network link aggregation optimization system in an embodiment may attempt to adaptively and dynamically optimize the links among the access points in a network at regular intervals in order to address constantly changing traffic, operational, and interference issues across the network. For example, the mesh network link aggregation optimization system in an embodiment may perform the routing algorithm and/or the link aggregation optimization method at regular intervals in order to identify the most efficient paths between access points in the network and to further optimize those paths in some cases by aggregating multiple links at one or more access points. In an example embodiment, the optimization timer may be five minutes, however it will be understood that any optimization timer period may be used in various embodiments. The method may then end.

In an embodiment in which the mesh network link aggregation optimization system determines no information handling systems within the network are capable of executing link aggregation optimization methods, the mesh network link aggregation optimization system in an embodiment may determine whether any information handling systems previously operating as access points within the network have left the network. For example, in an embodiment described with reference to FIG. 3, if the mesh network link aggregation optimization system determines none of the information handling systems within the network (e.g. 304-308) can execute instructions of the mesh network link aggregation optimization system, it may determine whether any information handling systems previously executing such instructions have left the network 300. When such an information handling system leaves a network 300, it may effectively remove one of the access points of the network 300, consequently leaving behind broken links. If this occurs, the network 300 may need to be reconfigured to account for such broken links. If the mesh network link aggregation optimization system in an embodiment determines an information handling systems previously operating as an access point within the network has left the network, the method may proceed directly to block 808 for performance of the routing algorithm to overcome the broken links. If the mesh network link aggregation optimization system in an embodiment determines no information handling systems previously operating as access points within the network have left the network, the method may proceed to block 816.

At block 816, the preset optimization timer may elapse. As described herein, the mesh network link aggregation optimization system in an embodiment may attempt to adaptively and dynamically optimize the links among the access points in a network at regular intervals in order to identify the most efficient paths between access points in the network and to further optimize those paths in some cases by aggregating multiple links at one or more access points. Changes in the number and identity of access points in the network poses one clear opportunity for reconfiguration of the network. However, changes to the traffic and efficiency of the network may occur even if the number, orientation, or identity of access points within the network remains the same. Thus, if the mesh network link aggregation optimization system in an embodiment determines at block 804 that there are no information handling systems within the network that may be set to operate as access points, and decides at block 814 that no information handling systems previously operating as access points within the network have since left, the mesh network link aggregation optimization system may still routinely perform the routing algorithm and link aggregation method of blocks 808 and 810. Thus, at block 816, when the preset optimization timer elapses, the mesh network link aggregation optimization system in an embodiment may perform the routing algorithm at block 808, perform the link aggregation optimization method at block 810, and reset the optimization timer at block 812. The method may then end.

Figure 9:
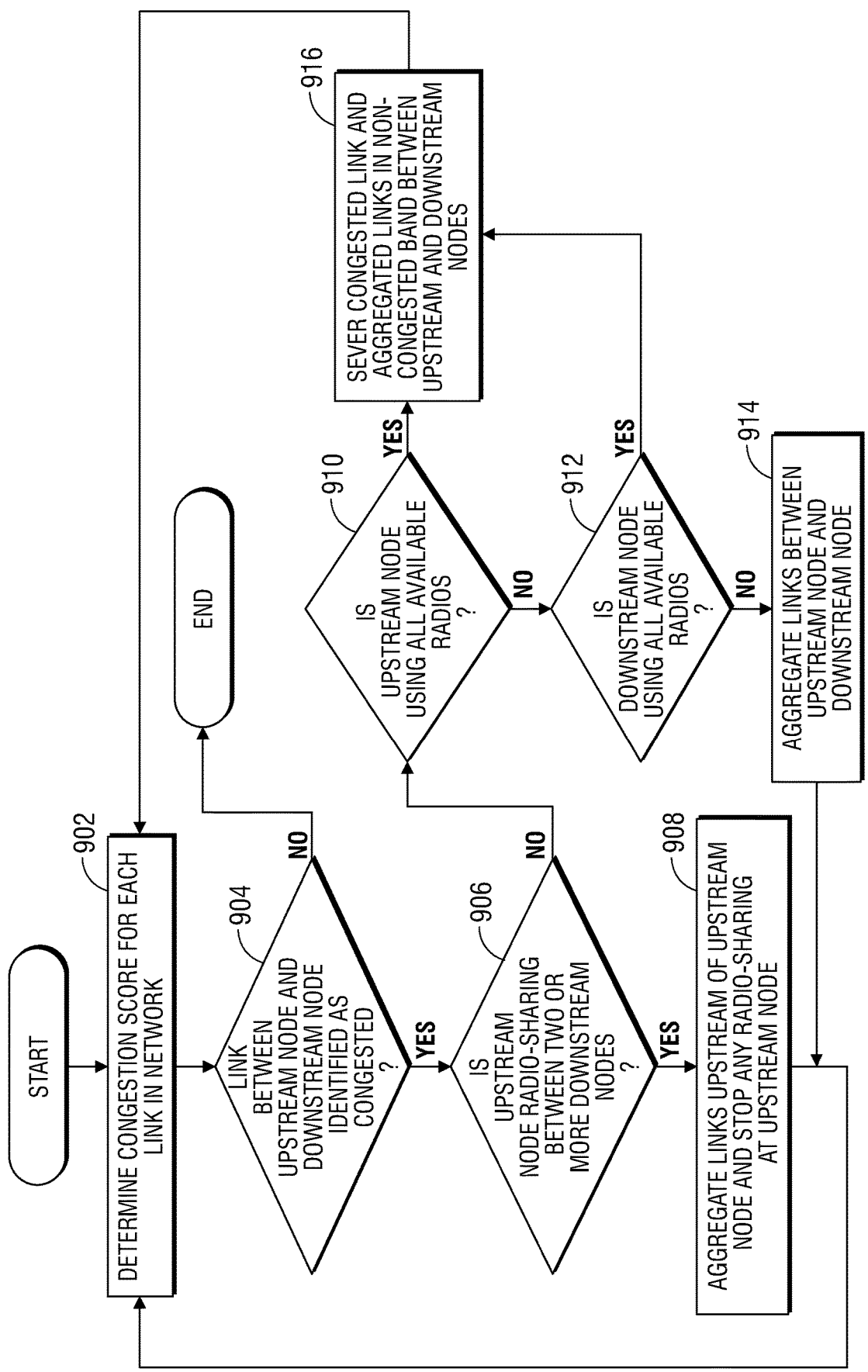
FIG. 9 is a block diagram illustrating a method for determining one or more nodes at which link aggregation may be optimally performed according to an embodiment of the present disclosure.

FIG. 9 is a block diagram illustrating a method for determining one or more nodes at which link aggregation may be optimally performed based on congestion scores across the network according to an embodiment of the present disclosure. The mesh network link aggregation optimization system in an embodiment may perform a link aggregation optimization method following performance of the ad-hoc routing algorithm to further optimize link configurations among the access points and client devices, as illustrated by the method of FIG. 9.

At block 902, the mesh network link aggregation optimization system in an embodiment may determine a congestion score for each link in an ad-hoc mesh network. A congestion score may be based on traffic, interference, Received Signal Strength Indication (RSSI), or Quality of Service (QoS) measurements at each node or access point of the network in an embodiment. Links between nodes experiencing satisfactory RSSI and/or QoS measurements may be associated with higher congestion scores, and links between nodes experiencing unsatisfactory RSSI and/or QoS measurements may be associated with lower congestion scores. For example, a congestion score may have a value from zero to ten, with ten indicating little to no congestion, and zero indicating full congestion indicative of a broken link. Several methods for determining a congestion score are known in the art, and any such method may be used at block 902.

The mesh network link aggregation optimization system may determine at block 904 whether any links between a non-gateway upstream node and a node directly downstream from such a non-gateway upstream node may have been identified as congested. A link may be congested in an embodiment if it does not meet a preset congestion threshold. For example, a link may be congested if the congestion score falls below five. In another example embodiment, a link may be congested if the congestion score falls below eight.

A non-gateway node in an embodiment may be a node other than a gateway or main router, and a gateway node may be a node in a mesh network that is in communication with each of the other nodes in the network. The term upstream may refer to a gateway node or a node connected to the gateway or main router using fewer links than another node, which may be said to be downstream from such upstream node. For example, in an embodiment described with reference to FIG. 5, the router 502 may be a gateway node, and the first information handling system 504 may be upstream from the second information handling system 506. Further, in such an embodiment, the third, fourth, and fifth information handling systems 506-512 may be said to be downstream of the first information handling system. However, only the second and third information handling systems 506 and 508 are immediately or directly downstream from the first information handling system 504.

In an example embodiment, the mesh network link aggregation optimization system may determine at block 904 that link 518 has a congestion score below the preset congestion threshold. In another example embodiment, the mesh network link aggregation optimization system may determine at block 904 that link 520 has a congestion score below the preset congestion threshold. In both of these example embodiments, the first information handling system 504 would be the upstream node, and the second information handling system 506 would be the downstream node. In another embodiment, the mesh network link aggregation optimization system described in an embodiment with respect to FIG. 6 may determine at block 904 that one or more of links 608, 516, or 602 has a congestion score below the preset congestion threshold. In yet another embodiment, the mesh network link aggregation optimization system in an embodiment described with reference to FIG. 7 may determine at block 904 that link 706 has a congestion score below the preset congestion threshold. If the mesh network link aggregation optimization system in an embodiment determines none of the links within the network are congested, link aggregation may not be necessary, and the method may then end. If the mesh network link aggregation optimization system in an embodiment identifies a link between an upstream and downstream node as congested with a score below an acceptable threshold congestion score level, the method may proceed to block 906 in order to determine one or more locations within the network where links may be aggregated at the network level in order to increase effectiveness of communication throughout the network.

At block 906, the mesh network link aggregation optimization system may determine whether the upstream node identified at block 904 is radio sharing between two or more downstream nodes. In order to determine which links could benefit from link aggregation in an embodiment, the mesh network link aggregation optimization system may determine the availability of radios that could be used for such a method at each node, and whether to aggregate links upstream from or bundled together with a congested link. If a node is already using a radio sharing method, this may indicate all radios are currently in use at such a node such that link aggregation may not be employed at that node in its current configuration. For example, in an embodiment described with reference to FIG. 5 in which link 520 has been identified at block 904 as a congested link, radio usage at the first information handling system 504 may be analyzed at block 906. The mesh network link aggregation optimization system in such an embodiment may determine at block 906 that the first information handling system 504 is currently using a radio sharing method between the second information handling system 506 and the third information handling system 508. In other words, the first information handling system 504 may be transmitting to the second information handling system 506 via link 520 on the 2.4 GHz band at a maximum data rate of 300 Mbps, while also transmitting to the third information handling system 508 via link 522 at a maximum data rate of 300 Mbps, also on the 2.4 GHz band.

As described herein, sharing the radio of the first information handling system 504 for transmission in the 2.4 GHz band between the links 520 and 522 decreases the data rate for each of links 520 and 522 by half. As such, radio sharing between two downstream nodes (e.g. the second and third information handling systems 506 and 508) is usually only done when the upstream node (e.g. the first information handling system 504) does not have any other free radio for transmission of either link 520 or link 522 on a band other than the 2.4 GHz band. For example, the first information handling system 504 in an embodiment may have one of four radios dedicated to receiving on the 2.4 GHz band, one of four radios dedicated to receiving on the 5 GHz band, and one of four radios dedicated to transmitting on the 5 GHz band. As such, the first information handling system may have only one radio available for transmission on both links 520 and 522 on the 2.4 GHz band.

Further, if the upstream node in the congested link is radio sharing with two or more downstream links, the use of the radio sharing method at the upstream link could be the direct cause of the congestion on the congested link. For example, congestion may be caused by a low data rate on a link. If the first information handling system 504 in an embodiment is forced to use radio sharing to transmit both links 520 and 522 on the 2.4 GHz bandwidth, it may decrease the data rate of each of links 520 and 522 by half (e.g. to 300 Mbps, rather than the 600 Mbps received at the first information handling system 504 on link 516), thus causing congestion scores for each of links 520 and 522 to drop below the preset congestion threshold. In an embodiment in which the upstream node is radio sharing between two or more downstream nodes, the method may proceed to block 908. If the upstream node is not radio sharing between two or more downstream nodes, the method may proceed to block 910 in order to determine what else could be causing the detected congestion.

In an embodiment in which the upstream node of the congested link is not radio sharing between two or more nodes directly downstream, the mesh network link aggregation optimization system in an embodiment may aggregate links upstream of the upstream node and stop any radio sharing at the upstream node at block 908. As described herein, if the node directly upstream of the congested link is radio sharing between two or more nodes directly downstream, the radio sharing may be causing the congestion detected. As such, at block 908, the mesh network link aggregation optimization system in such an embodiment may cease radio sharing at the upstream node and aggregate links upstream of the non-gateway upstream node. For example, the mesh network link aggregation optimization system in an embodiment described with reference to FIG. 5 may stop radio sharing between links 520 and 522 by severing or ceasing to transmit data via links 520 and 522. Doing so may free one of the four radios at the first information handling system 504, and the first information handling system 504 may establish a new link 602 with the second information handling system 506 on the 2.4 GHz band at a maximum data rate of 600 Mbps. In such a way, the second information handling system 506 may receive a total maximum data rate of 1400 Mbps rather than the 1100 Mbps achieved by the network configuration of FIG. 5. However, severing the link between the first information handling system 504 and the third information handling system 508 may require another node in the network to form a link with the third information handling system 508 such that it may rejoin the network 500.

Thus, the router 502 in an embodiment may establish one or more links with the third information handling system 508. For example, in an embodiment described with reference to FIG. 6, the router 502 may establish links 604 and 606 in order to transmit and receive data to and from the third information handling system 508 on the 2.4 GHz band at a maximum data rate of 600 Mbps each. The router 502 may do so using a layer three link aggregation method as described herein, allowing the third information handling system to receive data at a maximum data rate of 1200 Mbps, rather than the 300 Mbps achieved by the configuration of FIG. 5. In such a way, the mesh network link aggregation optimization system in an embodiment may use link aggregation upstream of the non-gateway upstream node (e.g. link aggregation between the router 502 and the third information handling system 508) to cure a congested link (e.g. link 520). The method may then return to block 902 to determine congestion scores for each link in the reconfigured network in order to determine if further link aggregation is needed at other nodes.

At block 910, in an embodiment in which the upstream node is not radio sharing, the mesh network link aggregation optimization system in an embodiment may determine whether the upstream node is using all available radios. If neither of the nodes upstream and downstream of the congested link are using all available radios, the mesh network link aggregation optimization system in an embodiment may use one radio of each of those nodes to create aggregate links between the upstream and downstream node. However, such an approach may only be available if each of the upstream and downstream nodes has an available radio.

If the node directly upstream of the congested link is not using all available radios, the method may proceed to block 912. For example, in an embodiment described with reference to FIG. 6 in which link 608 is identified as a congested link, the mesh network link aggregation optimization system may determine at block 910 that the upstream second information handling system 506 is not using all available radios and the method may proceed to block 912. As another example, in an embodiment described with reference to FIG. 6 in which link 516 is identified as a congested link and the router 502 communicates with the third information handling system 508 via only link 604, the mesh network link aggregation optimization system may determine at block 910 that the upstream router 502 is not using all available radios and the method may proceed to block 912. As yet another example, in an embodiment described with reference to FIG. 7 in which link 706 is identified as a congested link, the mesh network link aggregation optimization system may determine at block 910 that the upstream router 502 is not using all available radios and the method may proceed to block 912.

If the node directly upstream of the congested link is using all available radios, the method may proceed to block 916 in order to determine an alternative strategy for decreasing congestion. For example, in an embodiment described with reference to FIG. 6 in which link 602 is identified as a congested link, the mesh network link aggregation optimization system may determine at block 910 that the upstream first information handling system 504 is using all available radios, and the method may proceed to block 916.

In an embodiment in which the non-gateway upstream node is not using all available radios, the mesh network link aggregation optimization system in an embodiment may determine at block 912 whether the node directly downstream of the non-gateway upstream node is using all available radios. For example, in an embodiment described with reference to FIG. 6 in which link 608 is identified as a congested link, the mesh network link aggregation optimization system may determine at block 912 that the downstream fourth information handling system 510 is not using all available radios and the method may proceed to block 914. As another example, in an embodiment described with reference to FIG. 7 in which link 706 is identified as a congested link, the mesh network link aggregation optimization system may determine at block 912 that the downstream third information handling system 508 is not using all available radios and the method may proceed to block 914. In contrast, in an embodiment described with reference to FIG. 6 in which link 516 is identified as a congested link, the mesh network link aggregation optimization system may determine at block 912 that the downstream first information handling system 504 is using all available radios and the method may proceed to block 916.

At block 914, in an embodiment in which the upstream node is not radio sharing, and neither the upstream or downstream nodes are currently using all available radios, the mesh network link aggregation optimization system may aggregate links between upstream node and downstream node. For example, in an embodiment described with reference to FIG. 6 in which link 608, which is capable of a maximum data rate of 700 Mbps, is identified as a congested link, the mesh network link aggregation optimization system may aggregate links between the second information handling system 506 and the fourth information handling system 510. In an example embodiment described with reference to FIG. 7, the mesh network link aggregation optimization system may establish layer three aggregated links 708 and 710 in the 5 GHz band at block 914 in response. Each of link 708 and link 710 in such an embodiment may be capable of transmitting at a maximum data rate of 800 Mbps, which may improve the data rate between the second information handling system 506 and the fourth information handling system 510. Further, because layer three link aggregation is used in such a way, link 712 between the fourth information handling system 510 and the fifth information handling system 512 may not suffer the deleterious effects of a hopping method on its data rate. In other words, the fourth information handling system 510 may be capable of transmitting to the fifth information handling system 512 on link 712 at the maximum data rate of 1 Gbps allowable on the 60 GHz band. The improvement from 700 Mbps to 800 Mbps data rate for communications between the second and fourth information handling systems 506 and 510, and/or the improvement from 700 Mbps to 1 Gbps between the fourth and fifth information handling systems 510 and 512 may cause the congestion scores for those links to increase considerably. The method may then return to block 902 to determine congestion scores for each link in the reconfigured network in order to determine if further link aggregation is needed at other nodes.

In another example, in an embodiment described with reference to FIG. 7 in which link 706, which is capable of a maximum data rate of 1 Gbps, is identified as a congested link, the mesh network link aggregation optimization system aggregate links between the router 502 and the third information handling system 508. For example, if the link 706 is transmitted over a distance longer than the effective range for transmissions in the 60 GHz band, or if link 706 undergoes interference from a nearby 60 GHz band transmitting within another network, the actual data rate achieved by link 706 may be only 100 Mbps. In such an embodiment, the mesh network link aggregation optimization system may aggregate links between the router 502 and the third information handling system 508 in another band. For example, in an embodiment described with reference to FIG. 6, the mesh network link aggregation optimization system may establish layer three aggregated links 604 and 606 on the 2.4 GHz band between the router 502 and the third information handling system 508. Each of links 604 and 606 in such an embodiment may be capable of a maximum data rate of 600 Mbps, such that the third information handling system 508 may receive a maximum data rate of 1200 Mbps, which may be a significant increase from the 100 Mbps received via link 706. The method may then return to block 902 to determine congestion scores for each link in the reconfigured network in order to determine if further link aggregation is needed at other nodes.

In an embodiment in which the upstream node is not radio sharing, the upstream node is currently not using all available radios, but the downstream node is currently using all available radios such as determined at 912, the mesh network link aggregation optimization system may sever the congested link and aggregate links in a non-congested band between the upstream and downstream nodes at block 916. For example, in an embodiment described with reference to FIG. 6 in which link 516 is identified as a congested link in the 2.4 GHz band, the mesh network link aggregation optimization system may sever link 516 and aggregate two links in the 5 GHz band between the router 502 and the first information handling system 504. Link 516 in an embodiment may be identified as congested if, for example, it undergoes interference from a nearby link in the same 2.4 GHz band from another network, causing the data rate of link 516 to drop significantly below the 600 Mbps maximum data rate. In an example embodiment described with reference to FIG. 7, the mesh network link aggregation optimization system may sever link 516, establish link 702 in the 5 GHz band in its stead, and aggregate links 514 and 702. By switching from the 2.4 GHz band to the 5 GHz band, the mesh network link aggregation optimization system may effectively avoid deleterious effects or interference from nearby networks transmitting in the 2.4 GHz band. Further, link 702 may have a maximum data rate of 800 Mbps, such that the first information handling system 504 may receive a maximum data rate of 1600 Mbps, rather than the actual data rate falling below 1400 Mbps achievable by the configuration of the network 500 shown in FIG. 6. The method may then return to block 902 to determine congestion scores for each link in the reconfigured network in order to determine if further link aggregation is needed at other nodes.

In an embodiment in which the upstream node is not radio sharing, and the upstream node is using all available radios as determined at 910, the mesh network link aggregation optimization system may sever the congested link and aggregate links in a non-congested band between the upstream and downstream nodes at block 916. For example, in an embodiment described with reference to FIG. 6 in which link 602 is identified as a congested link, the mesh network link aggregation optimization system may sever link 602 operating in the 2.4 GHz band and may aggregate links in the 5 GHz band between the first information handling system 504 and the second information handling system 506. Link 602 in an embodiment may be experiencing interference from a nearby link in the same 2.4 GHz band from another network, causing the data rate to drop significantly below the 600 Mbps maximum data rate. In an example embodiment described with reference to FIG. 7, the mesh network link aggregation optimization system may sever link 602, establish link 704 in the 5 GHz band in its stead, and aggregate links 518 and 704. By switching from the 2.4 GHz band to the 5 GHz band, the mesh network link aggregation optimization system may effectively avoid deleterious effects or interference from nearby networks transmitting in the 2.4 GHz band. Further, link 704 may have a maximum data rate of 800 Mbps, such that the second information handling system 506 may receive a maximum data rate of 1600 Mbps, rather than the actual data rate falling below 1400 Mbps achievable by the configuration of the network 500 shown in FIG. 6. The method may then return to block 902 to determine congestion scores for each link in the reconfigured network in order to determine if further link aggregation is needed at other nodes.

The loop from block 902 to blocks 914 or 916 may be repeated in an embodiment until the mesh network link aggregation optimization system determines at block 904 that none of the links within the network qualify as congested. The method may then end. In some embodiments, the ad-hoc routing algorithm may be performed each time the method of FIG. 9 proceeds from either block 914 to block 902 or from block 916 to block 902.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system operating a mesh network link aggregation optimization system comprising:
   a wireless interface device for communicating with a plurality of mesh access points and one or more client devices connected via a plurality of wireless links forming a mesh wireless network, wherein each of the plurality of mesh access points is capable of routing one or more incoming wireless links to one or more downstream mesh access points or client devices;
   a processor executing code instructions of the mesh network link aggregation optimization system to:
   receive measured traffic and quality of service of each of the plurality of links;
   generate a congestion score for each of the plurality of wireless links based on the measured traffic and quality of service of each of the plurality of links;
   determine the congestion score for a congested one of the plurality of wireless links does not meet a preset congestion threshold value;
   determine a location within the mesh wireless network in which to aggregate links between two of the plurality of mesh access points, based on availability of one or more radios at one or more of the plurality of mesh access points; and
   transmit a command to a first one of the plurality of mesh access points to aggregate two or more links at a network layer at the determined location for simultaneous transmission on a single band to a second one of the plurality of mesh access points such that each of the plurality of links has a congestion score that meets or exceeds the preset congestion threshold value.

2. The information handling system of claim 1, wherein the single band on which the two or more links are aggregated is the 5 GHz band.

3. The information handling system of claim 1, wherein the single band on which the two or more links are aggregated is the 2.4 GHz band.

4. The information handling system of claim 1, wherein the single band on which the two or more links are aggregated is the 60 GHz band.

5. The information handling system of claim 1 further comprising:
   determining a first of the one or more client devices is not operating as an access point within the mesh wireless network to transmit or receive data to or from a plurality of access points or other client devices; and
   instructing the first one of the one or more client devices not operating as an access point to act as a mesh access point to transmit or receive data to or from a plurality of access points or other client devices.

6. The information handling system of claim 5 further comprising:
   a processor of the first of the one or more client devices instructed to operate as a mesh access point aggregating the two or more links for simultaneous transmission on the single band.

7. The information handling system of claim 5 further comprising:
   the processor executing code instructions of an ad-hoc routing algorithm to determine optimal link configurations between each of the plurality of mesh access points, and the one or more client devices.

8. A method of optimizing links aggregated at the network layer across a wireless mesh network comprising:
   measuring via a process traffic and quality of service of each of a plurality of links routed by a plurality of antenna front ends between a plurality of mesh access points, and one or more client devices within a mesh wireless network;
   generating a congestion score for each of the plurality of wireless links based on the measured traffic and quality of service of each of the plurality of links;
   determining the congestion score for a congested one of the plurality of wireless links does not meet a preset congestion threshold value;
   determining a first one of the one or more client devices is not operating as an access point within the mesh wireless network to transmit or receive data to or from a plurality of access points or other client devices;
   determining a location within the mesh wireless network in which to aggregate links between two of the plurality of mesh access points based on usage at one or more of the plurality of mesh access points of a radio sharing method; and
   aggregating two or more links at the determined location for simultaneous transmission on a single band via a front end of a first one of the plurality of mesh access points to a second one of the plurality of mesh access points such that each of the plurality of links has a congestion score that meets or exceeds the preset congestion threshold value.

9. The method of claim 8 further comprising:
   performing an ad-hoc routing algorithm to determine optimal link configurations between each of the plurality of mesh access points, and the one or more client devices.

10. The method of claim 9 further comprising:
    determining a preset optimization timer has elapsed;
    repeating the ad-hoc routing algorithm; and
    repeating the method of optimizing links aggregated at the network layer across a wireless mesh network.

11. The method of claim 8 further comprising:
    determining a preset optimization timer has elapsed; and
    repeating the method of optimizing links aggregated at the network layer across a wireless mesh network.

12. The method of claim 8 further comprising:
    determining a second one of the one or more client devices is not operating as an access point within the mesh wireless network to transmit or receive data to or from a plurality of access points or other client devices;
    instructing the second one of the one or more client devices not operating as an access point to act as a mesh access point to transmit or receive data to or from a plurality of access points or other client devices; and
    repeating the ad-hoc routing algorithm.

13. The method of claim 12 further comprising:
repeating the method of optimizing links aggregated at the network layer across a wireless mesh network.

14. The method of claim 8 further comprising: instructing the first one of the one or more client devices not operating as an access point to act as a mesh access point to transmit or receive data to or from a plurality of access points or other client devices.

15. An information handling system operating a mesh network link aggregation optimization system comprising:
a wireless interface device and front end controller for communicating with a plurality of mesh access points and one or more client devices connected via a plurality of wireless links forming a mesh wireless network, wherein each of the plurality of mesh access points includes an antenna front end controller for routing one or more incoming wireless links to one or more downstream mesh access points or client devices;
a processor executing code instructions of an ad-hoc routing algorithm to determine optimal link configurations between each of the plurality of mesh access points, and the one or more client devices;
the processor executing code instructions of the mesh network link aggregation optimization system to:
measure traffic and quality of service of each of the plurality of links;
generate a congestion score for each of the plurality of wireless links based on the measured traffic and quality of service of each of the plurality of links;
determine the congestion score for a congested one of the plurality of wireless links does not meet a preset congestion threshold value;
determine a location within the mesh wireless network in which to aggregate links between two of the plurality of mesh access points, based on availability of one or more radios at one or more of the plurality of mesh access points, and based on usage at one or more of the plurality of mesh access points of a radio sharing method; and
transmit a message to a front end controller of a first one of the plurality of mesh access points aggregating two or more links at a network layer at the determined location for simultaneous transmission on a single band to a second one of the plurality of mesh access points such that each of the plurality of links has a congestion score that meets or exceeds the preset congestion threshold value.

16. The information handling system of claim 15, wherein the single band on which the two or more links are aggregated is the 5 GHz band.

17. The information handling system of claim 15, wherein the single band on which the two or more links are aggregated is the 2.4 GHz band.

18. The information handling system of claim 15, wherein the single band on which the two or more links are aggregated is the 60 GHz band.

19. The information handling system of claim 15 further comprising:
determining a first one of the one or more client devices is not operating as an access point within the mesh wireless network to transmit or receive data to or from a plurality of access points or other client devices; and
instructing the first one of the one or more client devices not operating as an access point to act as a mesh access point to transmit or receive data to or from a plurality of access points or other client devices.

20. The information handling system of claim 19 further comprising:
a front end controller of the first one of the one or more client devices instructed to operate as a mesh access point aggregating the two or more links for simultaneous transmission on the single band.

\* \* \* \* \*